United States Patent
To et al.

(10) Patent No.: US 8,385,218 B2
(45) Date of Patent: Feb. 26, 2013

(54) COMMUNICATION APPARATUS AND COMMUNICATION METHOD

(75) Inventors: Shimpei To, Osaka (JP); Yasuhiro Hamaguchi, Osaka (JP); Hideo Namba, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 52 days.

(21) Appl. No.: 12/445,208

(22) PCT Filed: Oct. 10, 2007

(86) PCT No.: PCT/JP2007/069762
§ 371 (c)(1),
(2), (4) Date: Jul. 14, 2009

(87) PCT Pub. No.: WO2008/047646
PCT Pub. Date: Apr. 24, 2008

(65) Prior Publication Data
US 2009/0279419 A1 Nov. 12, 2009

(30) Foreign Application Priority Data

Oct. 12, 2006 (JP) ................................ 2006-279002
Apr. 3, 2007 (JP) ................................ 2007-097370

(51) Int. Cl.
*H04J 1/16* (2006.01)
(52) U.S. Cl. ........... 370/252; 375/240; 455/69; 370/310
(58) Field of Classification Search .................. None
See application file for complete search history.

(56) References Cited

U.S. PATENT DOCUMENTS

| 6,731,811 B1* | 5/2004 | Rose ............................... 382/238 |
| 7,039,044 B1* | 5/2006 | Whitfield et al. ............. 370/356 |
| 2001/0026513 A1* | 10/2001 | Koyata ........................ 369/47.26 |
| 2006/0153061 A1 | 7/2006 | Nishio |
| 2007/0153731 A1* | 7/2007 | Fine .............................. 370/329 |
| 2007/0258366 A1* | 11/2007 | Imamura ....................... 370/230 |

FOREIGN PATENT DOCUMENTS

| JP | 5-292326 A | 11/1993 |
| JP | 2002-209210 A | 7/2002 |
| JP | 2005-27107 A | 1/2005 |

OTHER PUBLICATIONS

Falahati, Sorour et al. "Assessment of Adaptive Transmission Technologies", Feb. 28, 2005, Winner, IST-2003-507581 D2.4 ver 1.1, 50-52.*

(Continued)

*Primary Examiner* — Jason Mattis
*Assistant Examiner* — James P Duffy
(74) *Attorney, Agent, or Firm* — Birch, Stewart, Kolasch & Birch, LLP

(57) ABSTRACT

To efficiently compress the information amount for feedback when a communication apparatus sends back a result of performing discrete cosine transform on the reception quality information to a communication apparatus of a communicating destination. In a communication apparatus for transmitting feedback information generated based on a plurality of reception quality information to a communicating destination apparatus, the feedback information is a result of performing discrete cosine transform on the plurality of reception quality information, and performing respective different quantization on signal components of at least a group of samples among signal components of a plurality of samples obtained by the discrete cosine transform.

10 Claims, 26 Drawing Sheets

OTHER PUBLICATIONS

Falahati, Sorour et al. "Assessment of Adaptive Transmission Technologies", Feb. 28, 2005, Winner, IST-2003-507581 D2.4 ver 1.1, 50-52.*

3GPP, TSG RAN WG1 ad hoc meeting on LTE, R1-060228, "Sensitivity of DL/UL Performance to CQI-Compression with Text Proposal", Jan. 23-25, 2006, Helsinki.*

Tan et al., "An Improved DCT-Based OFDM Data Transmission Scheme", 2005 IEEE 16th International Symposium on Personal, Indoor and Mobile Radio Communications, Sep. 11, 2005, vol. 2, pp. 745-749.

3GPP TR 25.814 V0.3.1, "Physical Layer Aspects for Evolved UTRA", (Nov. 2005), Release 7, pp. 16-27.

3GPP TSG RAN WG1 #42 on LTE, R1-050795, "Intra-Node B Macro Diversity based on Cyclic Delay Transmissions", Aug. 29-Sep. 2, 2005, London, UK.

Wang Chunning, Duan Yong, "Adaptive hybrid DCR/DPCM method with classified image coding", Journal of Xidian University, Mar. 1997, vol. 24, No. 1.

LG Electronics, "DCT based CQI reporting scheme "3GPP TSG RAN WG1 LTE Ad Hoc, R1-061777, Jun. 27-30, 2006, pp. 1-11.

* cited by examiner

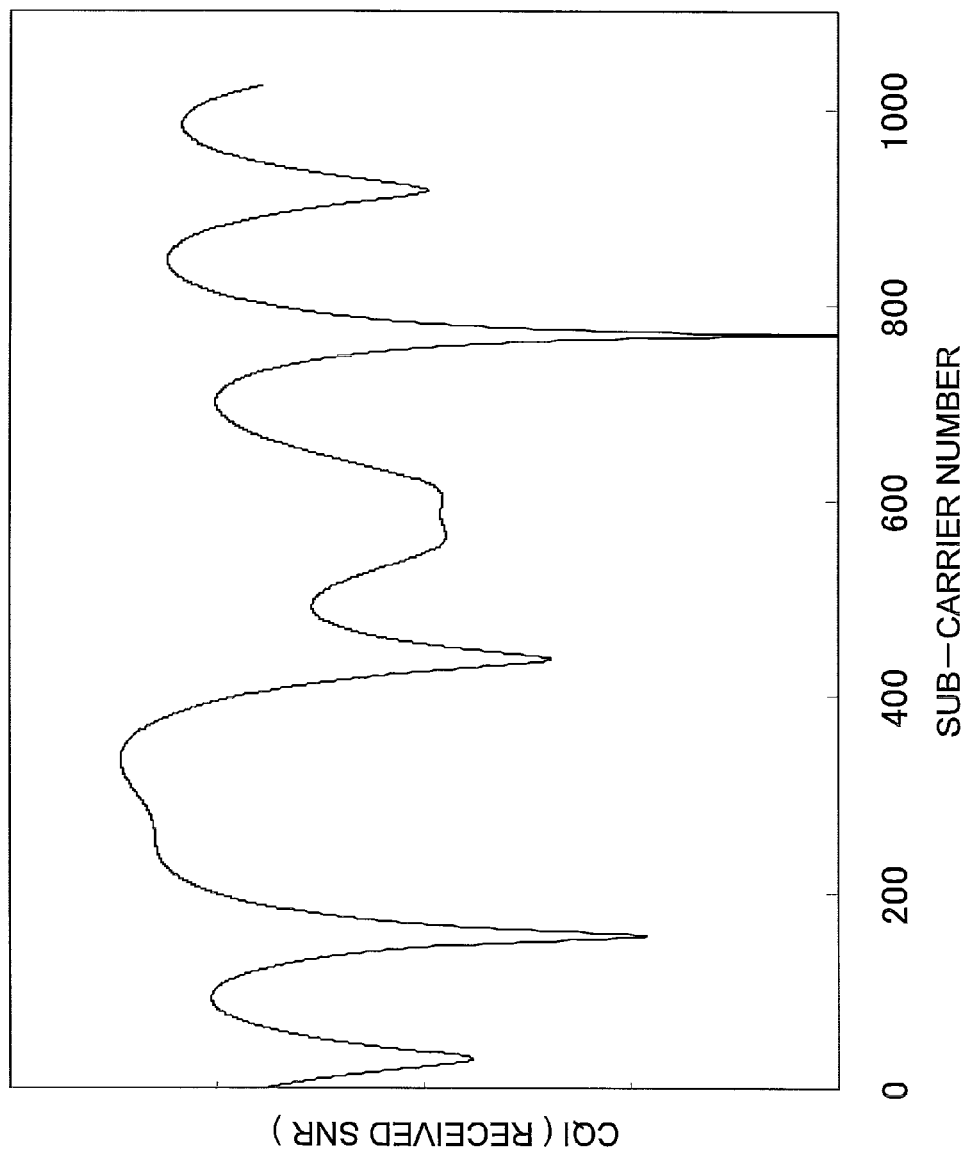

COMMUNICATION APPARATUS AND COMMUNICATION METHOD

TECHNICAL FIELD

The present invention relates to compression of the information amount when a communication apparatus sends back reception quality information as feedback to a communication apparatus of a communicating destination.

BACKGROUND ART

With increases in the amount of data communication in recent years, the need has been intensified for a mobile communication system having higher spectral efficiency, and various techniques have been proposed with the aim of actualizing the system. OFDMA (Orthogonal Frequency Division Multiple Access) is one of techniques having the possibility of enhancing the spectral frequency, and is determined to be applied to the downlink access scheme of the E-UTRA (Evolved Universal Terrestrial Radio Access) system of which standardization has been proceeding especially in 3GPP (The 3rd Generation partnership Project) (Non-patent Document 1).

This OFDMA system is a system in which users in a cell access to respective resource blocks divided by time and frequency, and is capable of performing scheduling for assigning users to resource blocks providing good quality, and controlling transmission parameters such as a modulation scheme, coding rate, transmit power and the like for each resource block. Herein, in order to perform scheduling of users and controlling the modulation scheme/coding rate for each resource block suitably, it is necessary for the transmitting side to grasp channel conditions on the receiving side. Therefore, the need arises for the receiving side to notify (as feedback) the transmitting side of reception conditions. Such feedback information about channel conditions is called CQI (Channel Quality Indicator) in the E-UTRA system.

As described above, the receiving side needs to send back the CQI to the transmitting side in adaptive control of a modulation scheme and the like, and when a lot of CQIs are sent back, the problem arises that the spectral efficiency on uplink severely degrades. One of means for solving the problem is a CQI compression method using discrete cosine transform (hereinafter abbreviated as "DCT") (Non-patent Document 2).

Shown herein is an example in the case of performing DCT processing on reception quality information (reception quality measurement result). FIG. 1 is a diagram showing an example of the reception quality information, and FIG. 2 is a diagram showing an example of a result of performing DCT processing on the reception quality information as shown in FIG. 2. FIG. 1 shows the reception quality information (CQI (Received SNR)) in association with the subcarrier number (Sub-carrier Number). Further, FIG. 2 shows an absolute value (Absolute Value after DCT) of a sample value subjected to DCT processing indicative of a result (signal component) of performing DCT processing on the reception quality information in association with the sample number (Sample Number).

As shown in FIG. 1, in the case of performing DCT processing (the number of points is "1024") on the CQI (the number of subcarriers is "1024") varying continuously in the frequency region, the result of the DCT processing is indicated as shown in FIG. 2 as an example. The DCT-processed signal components gather in the low-frequency region as shown in FIG. 2, and high-frequency components are an extremely small value (nearly zero). By exploiting such a property, Non-patent Document 2 provides the method of sending back only the low-frequency components without sending back the high-frequency components of the signal subjected to DCT, and thereby compressing the feedback amount of CQI. FIG. 26 is a diagram showing an example of a state where the low-frequency components are only sent back. After receiving CQI which is compressed in this way, the transmitting side inserts zero in sample points of deleted high-frequency components, performs inverse discrete cosine transform (hereafter abbreviated as "IDCT"), and is able to reproduce the CQI observed on the receiving side, while hardly undergoing the effect of deleted high-frequency components.

Non-patent Document 1: 3GPP, TR 25.814 v0.3.1, "Physical Layer Aspects for Evolved UTRA"

Non-patent Document 2: 3GPP, TSG RAN WG1 ad hoc meeting on LTE, R1-060228, "Sensitive of DL/UL Performance to CQI Compression with Text Proposal"

DISCLOSURE OF INVENTION

Problems to be Solved by the Invention

As described above, by deleting high-frequency components in a signal of a result of performing DCT processing on the CQI in the frequency region, it is possible to compress the feedback amount of CQI. This is because the CQI in the frequency region varies continuously and relatively moderately, an absolute value of a signal component subjected to the DCT processing is high in the low-frequency region, while being an extremely low value in the high-frequency region, and the effect is hardly exhibited by deleting components in the high-frequency region to notify the transmitting side.

However, although the absolute value of the DCT-processed signal component is significantly different between the low-frequency region and the high-frequency region, the numbers of bits representing such values are usually constant (see FIG. 26), and it is uncertain that efficient feedback is performed. Further, in an environment with large delay spread of a channel, since the DCT-processed signal components spread also in the high-frequency region, the need arises for feedback of the high-frequency component to keep the error in reproducing the CQI constant, and the problem occurs that the feedback amount increases.

The present invention was carried out in view of such circumstances, and it is an object to provide a communication apparatus for efficiently compressing the information amount for feedback when the communication apparatus sends back a result of performing DCT on reception quality information to a communication apparatus of a communicating destination, and related techniques.

Means for Solving the Problem (1) A communication apparatus according to the invention is a communication apparatus for transmitting feedback information generated based on a plurality of reception quality information to a communicating destination apparatus, and is characterized in that the feedback information is a result of performing discrete cosine transform on the plurality of reception quality information, and performing respective different quantization on signal components of at least a group of samples among signal components of a plurality of samples obtained by the discrete cosine transform.

Thus, the communication apparatus according to the invention generates, as the feedback information, a result of performing different quantization on signal components of two arbitrary samples (at least a group) among signal components (sample values) of a plurality of samples obtained by discrete cosine transform of the reception quality information. The different quantization includes the case of quantizing with respective different information amounts, and the case of quantizing by respective different resolutions. For example, using the number of bits, two arbitrary samples are represented by respective different information amounts (for example, the different numbers of bits). Further, quantization may be performed by respective different resolutions. Thus represented result is transmitted (notified) to the communicating destination apparatus as the feedback information. By this means, it is possible to suppress the error occurring in reproducing the reception quality information from the feedback information in the communicating destination apparatus, while compressing the feedback information amount.

(2) Further, the communication apparatus according to the invention is characterized by having a quantizing section which sets respective different information amounts or resolutions on a plurality of sample groups including one or more samples, and quantizes a signal component of each sample with a set information amount or resolution.

Thus, by setting respective different information amounts or resolutions on a plurality of sample groups including one or more samples, and quantizing a signal component of each sample with the set information amount or resolution, it is possible to compress the feedback information amount, while guaranteeing the information amount or resolution for suitably representing a signal component.

(3) Furthermore, in the communication apparatus according to the invention, the quantizing section is characterized by setting the larger information amount or a finer resolution on the low-frequency sample group than on the high-frequency sample group.

Thus, based on the fact that results of DCT of reception quality information gather in signal components of low-frequency samples, by setting the larger information amount or a finer resolution on samples with lower frequencies, it is possible to guarantee the information amount or resolution for suitably representing the signal component and to compress the feedback information amount.

(4) Still furthermore, in the communication apparatus according to the invention, the quantizing section is characterized by varying the information amounts or resolutions based on the delay spread of the channel.

When the delay spread of the channel increases, since the signal components subjected to DCT spread also in the high-frequency region, by suitably varying the information amount or resolution based on the delay spread of the channel, it is possible to guarantee the information amount or resolution for suitably representing the signal component, without increasing the feedback information amount.

(5) Moreover, in the communication apparatus according to the invention, the quantizing section is characterized by setting the small information amount or a rough resolution for representing a signal component of the high-frequency sample group when the delay spread of the channel is less than a threshold, while setting the large information amount or a fine resolution for representing a signal component of the high-frequency sample group when the delay spread of the channel is the threshold or more.

Thus, the small information amount or a rough resolution for representing a signal component of the high-frequency sample group is set when the delay spread of the channel is less than a threshold, while the large information amount or a fine resolution for representing a signal component of the high-frequency sample group is set when the delay spread of the channel is the threshold or more. It is thereby possible to vary the information amount or resolution of a sample that is a subject of feedback corresponding to the channel conditions.

(6) Further, in the communication apparatus according to the invention, the quantizing section is characterized by setting the large information amount or a fine resolution for representing a signal component of the low-frequency sample group when the delay spread of the channel is less than a threshold, while setting the small information amount or a rough resolution for representing a signal component of the low-frequency sample group when the delay spread of the channel is the threshold or more.

Thus, the large information amount or a fine resolution for representing a signal component of the low-frequency sample group is set when the delay spread of the channel is less than a threshold, while the small information amount or a rough resolution for representing a signal component of the low-frequency sample group is set when the delay spread of the channel is the threshold or more. It is thereby possible to vary the information amount or resolution of a sample that is a subject of feedback corresponding to the channel conditions.

(7) Furthermore, the communication apparatus according to the invention is characterized by having a sample deleting section that deletes part of a plurality of samples subjected to the discrete cosine transform from the feedback information.

Thus, by deleting signal components of samples which are low and eliminate the need of being notified as the feedback information, it is possible to compress the feedback information amount, while properly representing signal components.

(8) Still furthermore, in the communication apparatus according to the invention, the sample deleting section is characterized by deleting signal components of the high-frequency samples.

Thus, by deleting signal components of high-frequency samples with low signal components of samples based on characteristics of DCT, it is possible to compress the feedback information amount, while properly representing signal components.

(9) Moreover, in the communication apparatus according to the invention, the sample deleting section is characterized by varying the number of samples to delete based on the delay spread of the channel.

Thus, when the delay spread of the channel increases, since signal components subjected to DCT spread also in the high-frequency region, by appropriately varying the number of samples for feedback based on the delay spread of the channel, it is possible to guarantee the information amount for suitably representing the signal component.

(10) Further, in the communication apparatus according to the invention, the sample deleting section is characterized by decreasing the number of samples to delete when the delay spread of the channel is a predetermined threshold or more.

Thus, when the delay spread of the channel increases, since signal components subjected to DCT spread also in the high-frequency region, by decreasing the number of samples deleted in the sample deleting section based on the delay spread of the channel to increase the number of samples for feedback, it is possible to guarantee the information amount for suitably representing the signal component.

(11) Furthermore, in the communication apparatus according to the invention, the quantizing section is characterized by setting respective different information amounts or resolutions on a plurality of sample groups including one or more samples, and quantizing a signal component of each sample with a set information amount or resolution.

Thus, respective different information amounts or resolutions are set on a plurality of sample groups including one or more samples, a signal component of each sample is quantized with the set information amount or resolution, and therefore, for example, by making the resolution rough, it is possible to reduce the error occurring due to the fact that a sample with a high absolute value cannot be represented with a fine resolution.

(12) Further, a communication apparatus according to the invention is a communication apparatus for transmitting feedback information generated based on a plurality of reception quality information to a communicating destination apparatus, and is characterized by having a quantizing section which performs discrete cosine transform on the plurality of reception quality information, divides signal components of a plurality of samples obtained by the discrete cosine transform into one or more sample groups including one or more samples, performs normalization for each sample group using a sample with the highest absolute value in each sample group, and quantizes a result of the normalization.

Thus, since normalization is performed for each sample group using a sample with the highest absolute value in each sample group and a result of the normalization is quantized, it is possible to represent all the samples with the set number of bits.

(13) Furthermore, in the communication apparatus according to the invention, the quantizing section is characterized by setting respective different information amounts for each sample group, and quantizing a signal component of each sample with a set information amount.

Thus, since respective different information amounts are set for each sample group and a signal component of each sample is quantized with the set information amount, it is possible to compress the feedback information amount, while guaranteeing the information amount for suitably representing a signal component.

(14) Still furthermore, the communication apparatus according to the invention is characterized by further having a calculating section which calculates an average value of the plurality of reception quality information, and subtracts a calculated average value from the plurality of reception quality information to calculate a subtraction value, and a discrete cosine transform section that performs discrete cosine transform on the subtraction value calculated in the subtracting section to calculate signal components of a plurality of samples.

Thus, by performing DCT on a subtraction value obtained by subtracting the average value from the reception quality information, it is possible to make a signal component of a sample with the lowest frequency zero.

(15) Moreover, the communication apparatus according to the invention is characterized by further having a sample deleting section that deletes a signal component of a sample with the lowest frequency from the feedback information among the signal components of the plurality of samples quantized in the quantizing section.

Thus, by performing DCT processing on the subtraction value, it is possible to make a signal component of a sample with lowest frequency zero, and to delete the signal component from the feedback information. By this means, it is possible to further compress the feedback information amount. More specifically, the quantizing section quantizes signal components of a plurality of samples calculated by the DCT section performing DCT processing on a subtraction value calculated in the calculating section, the sample deleting section deletes the signal component of the sample with the lowest frequency from the signal components of the plurality of samples quantized by the quantizing section, and feedback information is generated such that the signal component of the sample with the lowest frequency is zero. Further, when normalization is performed with the maximum absolute value for each region, some sample except the first sample has the maximum value in the lowest-frequency region, and normalization is performed with the sample. Since the first sample usually has an extremely high component as compared with the other samples, by performing normalization with a sample other than the first sample, it is possible to set a further finer resolution for representing each sample of the region as compared with the case of performing normalization using the first sample, and to reduce the reproduction error of CQI.

(16) Further, in the communication apparatus according to the invention, it is a feature that an average value calculated in the calculating section is transmitted to the communicating destination apparatus, as well as the feedback information.

Thus, since the signal component of the sample with the lowest frequency is not included in the feedback information, by notifying the average value at predetermined timing, it is possible to suppress the occurrence of an error of reproduced reception quality information.

(17) Furthermore, in the communication apparatus according to the invention, it is another feature that the reception quality information is information indicating reception quality on a predetermined unit basis in a signal received from the communicating destination apparatus by any one of reception power, signal to noise power ratio of a received signal, and signal to interference plus noise power ratio of a received signal.

Thus, it is possible to use the reception power and the like as the reception quality information.

(18) Further, a communication apparatus according to the invention is a communication apparatus for receiving feedback information generated based on a plurality of reception quality information from a communicating destination apparatus, and is characterized in that the feedback information is a result of performing discrete cosine transform on the plurality of reception quality information, and performing respective different quantization on signal components of at least a group of samples among signal components of a plurality of samples obtained by the discrete cosine transform.

Thus, the communication apparatus according to the invention receives, as the feedback information, a result of performing discrete cosine transform on the plurality of reception quality information, and performing respective different quantization on signal components of at least a group of samples among signal components of a plurality of samples obtained by the discrete cosine transform. By this means, it is possible to suppress the error occurring in reproducing the reception quality information from the feedback information, while compressing the feedback information amount.

(19) Furthermore, a communication apparatus according to the invention is a communication apparatus for receiving feedback information generated based on a plurality of reception quality information from a communicating destination apparatus, and is characterized in that the feedback information is a result of performing discrete cosine transform on the plurality of reception quality information, dividing signal components of a plurality of samples obtained by the discrete cosine transform into one or more sample groups including one or more samples, and performing normalization for each sample group using a sample with the highest absolute value in each sample group.

Thus, since normalization is performed for each sample group using a sample with the highest absolute value in each sample group and a result of the normalization is quantized, it is possible to represent all the samples with the set number of bits.

(20) A communication method according to the invention is a communication method for transmitting and receiving feedback information generated based on a plurality of reception quality information between communication apparatuses, and is characterized in that the plurality of reception quality information is subjected to discrete cosine transform, information amounts or resolutions for representing signal components of a plurality of samples obtained by the discrete cosine transform are set at respective different values on signal components of at least a group of samples, and one communication apparatus transmits feedback information indicating signal components of the samples using the set information amounts or resolutions to the other communication apparatus.

Thus, in the communication method according to the invention, a plurality of reception quality information is subjected to discrete cosine transform, the information amounts or resolutions for representing signal components of a plurality of samples obtained by the discrete cosine transform are set at respective different values on signal components of at least a group of samples, and feedback information indicating signal components of the samples using the set information amounts or resolutions is transmitted and received. By this means, it is possible to suppress the error occurring in reproducing the reception quality information from the feedback information, while compressing the feedback information amount.

(21) Further, a communication method according to the invention is a communication method for transmitting and receiving feedback information generated based on a plurality of reception quality information between communication apparatuses, and is characterized in that the plurality of reception quality information is subjected to discrete cosine transform, signal components of a plurality of samples obtained by the discrete cosine transform are divided into one or more sample groups including one or more samples, and one communication apparatus transmits feedback information obtained by performing normalization for each sample group using a sample with the highest absolute value in each sample group to the other communication apparatus.

Thus, since normalization is performed for each sample group using a sample with the highest absolute value in each sample group and a result of the normalization is quantized, it is possible to represent all the samples with the set number of bits.

Advantageous Effect of the Invention

According to the invention, when the communication apparatus sends back a result of performing DCT on reception quality information to a communication apparatus of a communicating destination, it is possible to compress the amount of feedback information, while suppressing the error occurring in reproducing the feedback information.

BRIEF DESCRIPTION OF DRAWINGS

FIG. 20 is a diagram showing an example of the reception quality information differing from in Embodiment 1;

FIG. 21 B is a diagram showing a result in the low-frequency region of performing DCT processing on the reception quality information as shown in FIG. 20, where is a result of performing DCT processing without subtracting the CQI average value;

DESCRIPTION OF SYMBOLS

Figure 1:
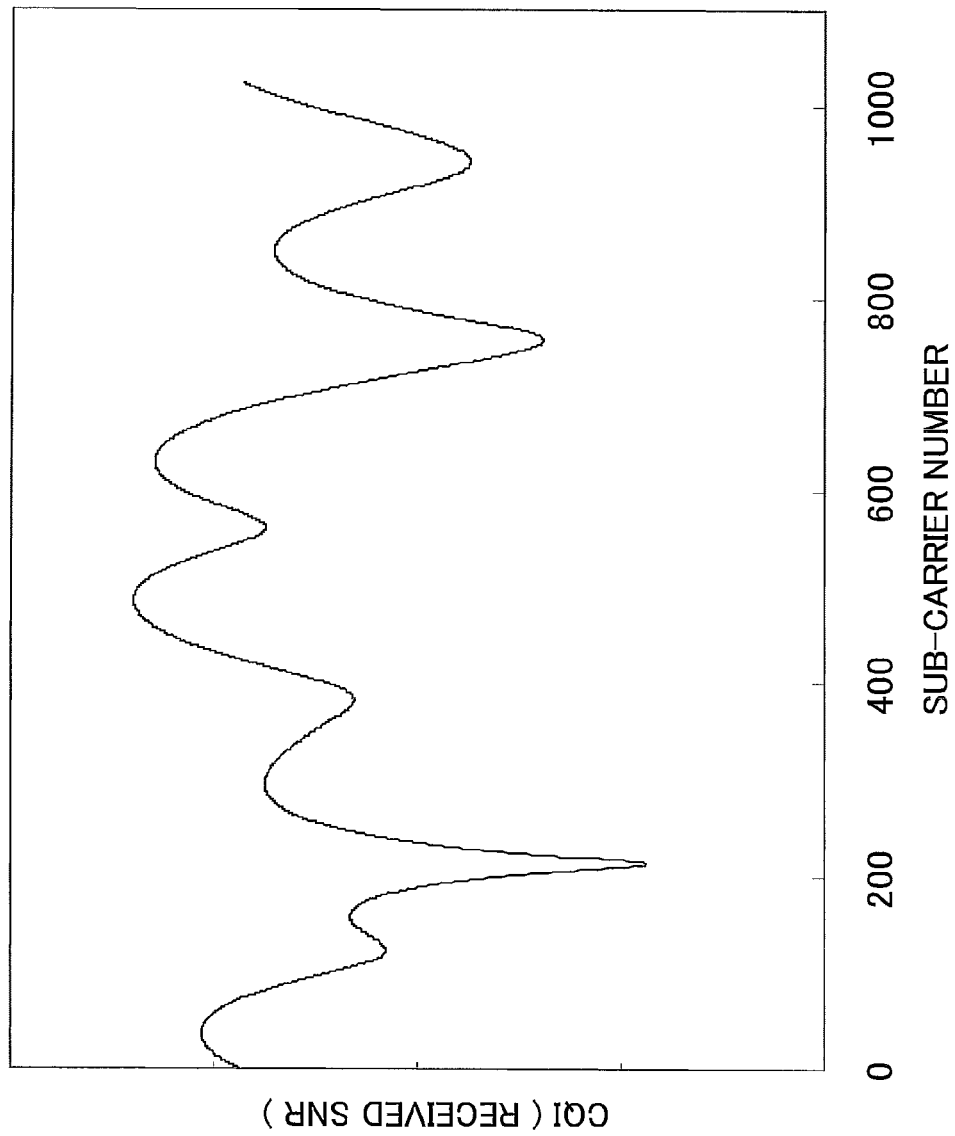
FIG. 1 is a diagram showing an example of reception quality information.

10 Antenna section
11 Radio section
12 Switch
13 A/D conversion section (A/D)
14 synchronization section 14
15 GI removing section
16, 30 S/P transform section (S/P)
17 FFT section (FFT)
18 Channel estimation section
19 Channel compensation section
20 Demapping section
21 P/S transform section (P/S)
22 Decoding section
23 CQI measuring section
24 DCT section
25 Quantizing section
26 Sample removing section
27, 37, 45, 52, 55 Receiver
28 Coding section
29 Modulation section
31 IFFT section (IFFT)
32 GI inserting section
33 D/A conversion section (D/A)
34, 44, 45, 53 Transmitter
36 Delay spread determining section
40 Sample generating section
41 Zero inserting section
42 IDCT section
44 Scheduling/modulation scheme determining section
50 Average value calculating section
51 Average value subtracting section
54 Average value adding section
56 Calculating section

BEST MODE FOR CARRYING OUT THE INVENTION

Embodiments of the invention will be described below with reference to accompanying drawings. Structural elements having the same structures or same functions and corresponding portions in the drawings are assigned the same reference numerals, and descriptions thereof are omitted. Further, in this description, each Embodiment is described using following terms.

The reception quality information is a reception quality measurement result measured in a receiver receiving a signal, and for example, includes "reception power", "received SNR (Signal to Noise power Ratio)", "received SINR (Signal to Interference plus Noise power Ratio)" and the like. Further, the reception quality information may be a measurement result, reception quality measurement result or CQI. Each of the following Embodiments is described on the assumption that the reception quality information is reception quality information or CQI.

The feedback information is information to notify (report) reception conditions to a communication apparatus of a communicating destination, and information indicative of channel conditions measured by the receiving side based on a signal received from the transmitting side. In the Embodiments, the feedback information is generated based on a result of performing DCT processing on the reception quality information. The feedback information is also referred to as quality notification information or CQI information. Each of the following Embodiments is described on the assumption that the feedback information is feedback information or CQI information.

A signal component of a sample indicates a result (value) of performing DCT processing on the reception quality information i.e. sample value of each sample subjected to the DCT processing. In each of the following Embodiments, a result of performing DCT processing on the reception quality information is described as a signal component of a DCT-processed sample or DCT-processed sample value.

In the following descriptions, the number of bits is used to explain as the information amount of memory (unit of memory amount) for expressing the feedback information, but the invention is not limited to the case of handling the information amount in the bit unit, and in the case of using another unit indicating the information amount, the unit capable of indicating the degree of information amount of memory is allowed.

Further, the following descriptions use a system configuration with the side for notifying (transmitting) the feedback information and the side for receiving notification of the feedback information to explain. Herein, the descriptions are made on the assumption that the side for notifying the feedback information is a terminal (communication terminal apparatus), and that the side for receiving notification of the feedback information is a base station (communication control apparatus, control station).

Embodiment 1

This Embodiment shows techniques for setting the number of bits (information amount) for representing a signal component of each sample subjected to DCT processing at a different value to compress the CQI feedback amount (feedback information amount).

As described previously, in the case of performing DCT processing on the CQI varying continuously and moderately in the frequency region, an absolute value of the DCT-processed signal component is high (large) in the low-frequency region, and becomes an extremely low (small) value as the frequency increases. Therefore, in this Embodiment, the number of bits for representing a signal component of each sample subjected to the DCT processing is set based on the frequency. Herein, the frequency is proportional to the sample number (Sample Number) in ascending order. More specifically, the number of bits to represent a DCT-processed signal in the low-frequency region is set at a high value, while the number of bits to represent a DCT-processed signal in the high-frequency region is set at a low value. By setting in this way, it is possible to reduce the number of bits with the error hardly occurring when the communication apparatus of the communicating destination performs IDCT processing on the feedback information, and to compress the feedback amount of CQI. This specific example is shown in FIG. 1. In addition, it is assumed herein that the CQI expresses received SNR or received SINR of each subcarrier.

Figure 2:
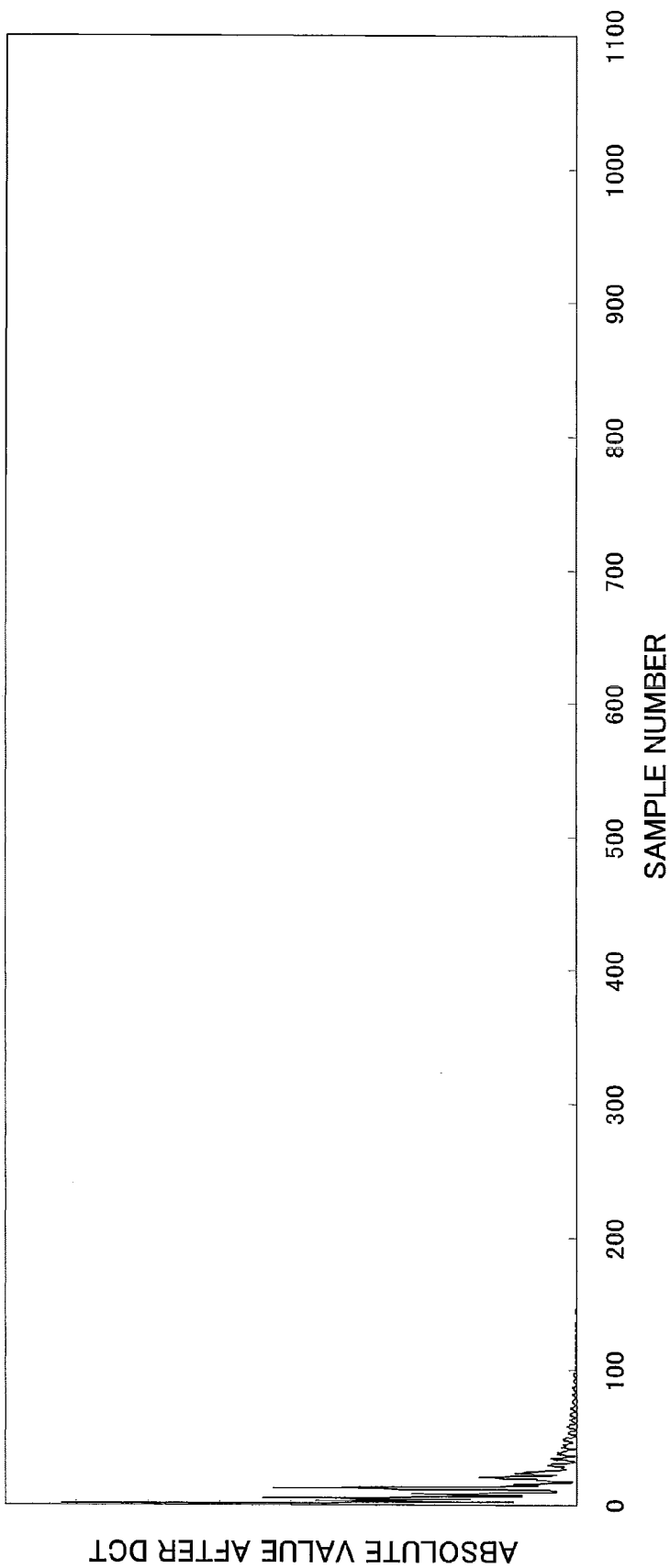
FIG. 2 is a diagram showing an example of a result of performing DCT processing on the reception quality information as shown in FIG. 2.
Figure 3:
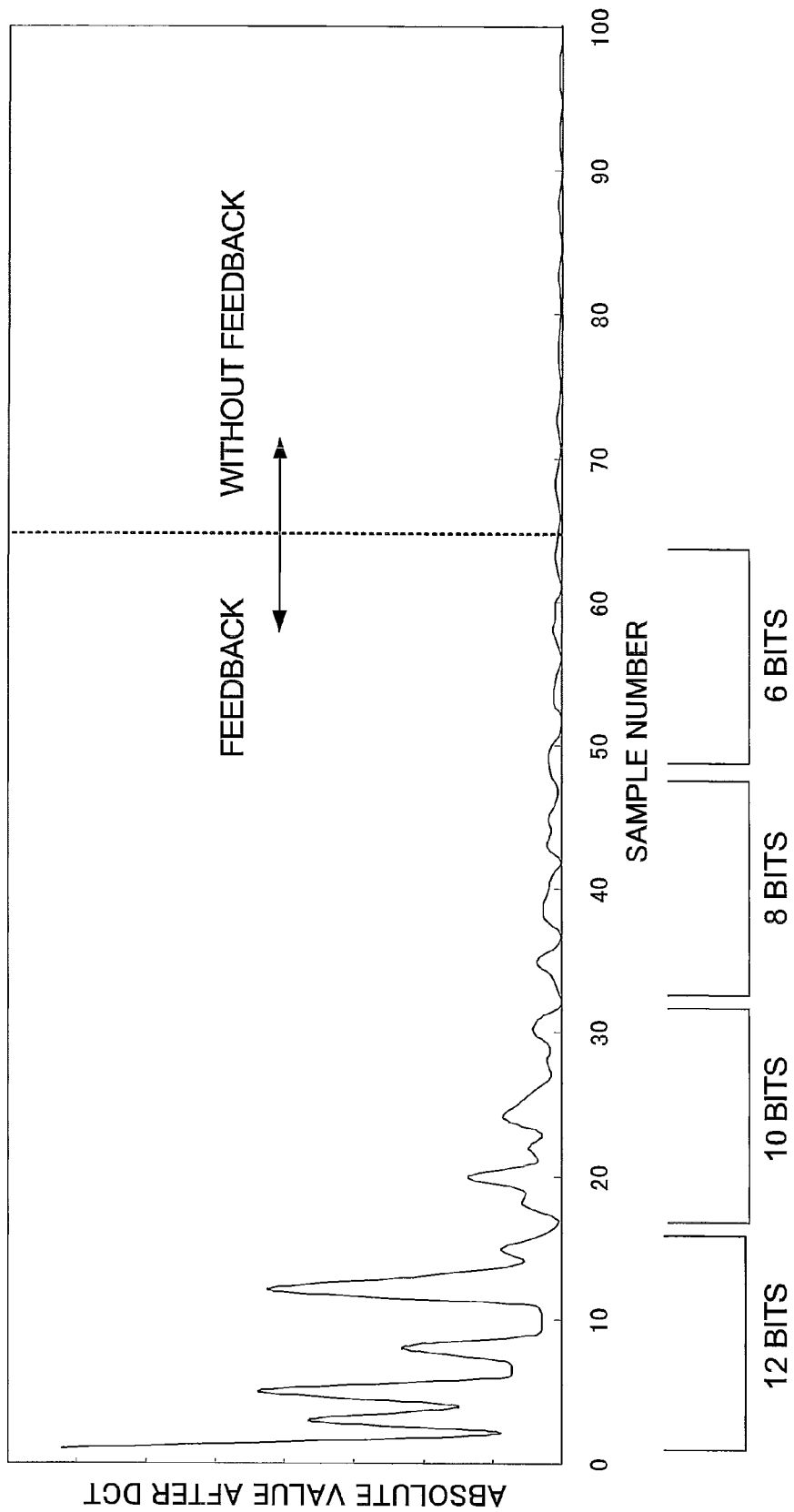
FIG. 3 is a diagram showing the enlarged result of sample numbers 0 to 100 in FIG. 2.

FIG. 1 is a diagram showing an example of the reception quality information. The reception quality information as shown in FIG. 1 varies continuously in the frequency region (frequency domain). In other words, FIG. 1 shows the state where the reception quality moderately varies among subcarriers, and therefore, shows the case that the reception quality does not vary sharply (discontinuously). FIG. 2 is a diagram showing an example of a result of performing DCT processing on the reception quality information as shown in FIG. 1. Further, FIG. 3 is a diagram showing enlarged results of sample numbers 0 to 100 in FIG. 2. Below the horizontal axis is shown an example of dividing a plurality of samples subjected to DCT processing into sample groups including at least one sample, and setting the number of bits for representing a sample value of each sample for each sample group. In addition, in each of the following Embodiments, descriptions will be given using the drawings with the same structures as in FIGS. 1 to 3, and since the structures of the drawings are the same, descriptions thereof are omitted.

As shown in FIG. 3, with respect to signal components of respective samples subjected to DCT processing, the first to 16th samples are represented by 12 bits, the 17th to 32nd samples are represented by 10 bits, the 33rd to 48th samples are represented by 8 bits, and the 49th to 64th samples are represented by 6 bits. In addition, the steps (resolution) to quantize are constant. Further, the 65th and subsequent samples are deleted, and only 64 samples are sent back to the transmitting side as the CQI information (feedback information in which 1024 samples are compressed to 64 samples). The number of samples for feedback and the number of bits for representing a signal component of each sample are assumed to be known on both the transmitting and receiving sides. Thus, with respect to DCT-processed signal components, the numbers of bits for samples with low frequencies are increased, while the numbers of bits for samples with high frequencies are decreased, and the feedback information expressing signal components of samples is generated using the numbers of bits (the number of bits is a value of 1 or more without including zero) different between samples.

The number of bits required to perform bit allocation as shown in FIG. 3 is 576, and it is possible to reduce 192 bits as compared with the case of representing all the samples (first 64 samples) for feedback by 12 bits, or 64 bits as compared with the case of representing by 10 bits. Herein, the number of bits is set at a different value for each unit (each sample group) consisting of some samples, but may be set at a different number for each sample. Further, the numbers of samples contained in a plurality of samples may be varied with the sample group. In FIG. 3, each sample group contains 16 samples, but sample groups may be assigned the different numbers of samples e.g. 1, 7, 16 . . . . Each of a plurality of samples contains at least one sample, and based on a signal component of each sample, a plurality of samples is before hand grouped into a plurality of sample groups. The number of bits is set to suitably express the signal component.

As described above, in sending back the CQI information subjected to DCT processing to the transmitting side as feedback, by representing a sample by the lower number of bits as the frequency components increases, it is possible to greatly reduce the feedback amount. Further, by deleting samples with high-frequency components among all the samples, it is possible to further reduce the feedback amount.

Figure 4:
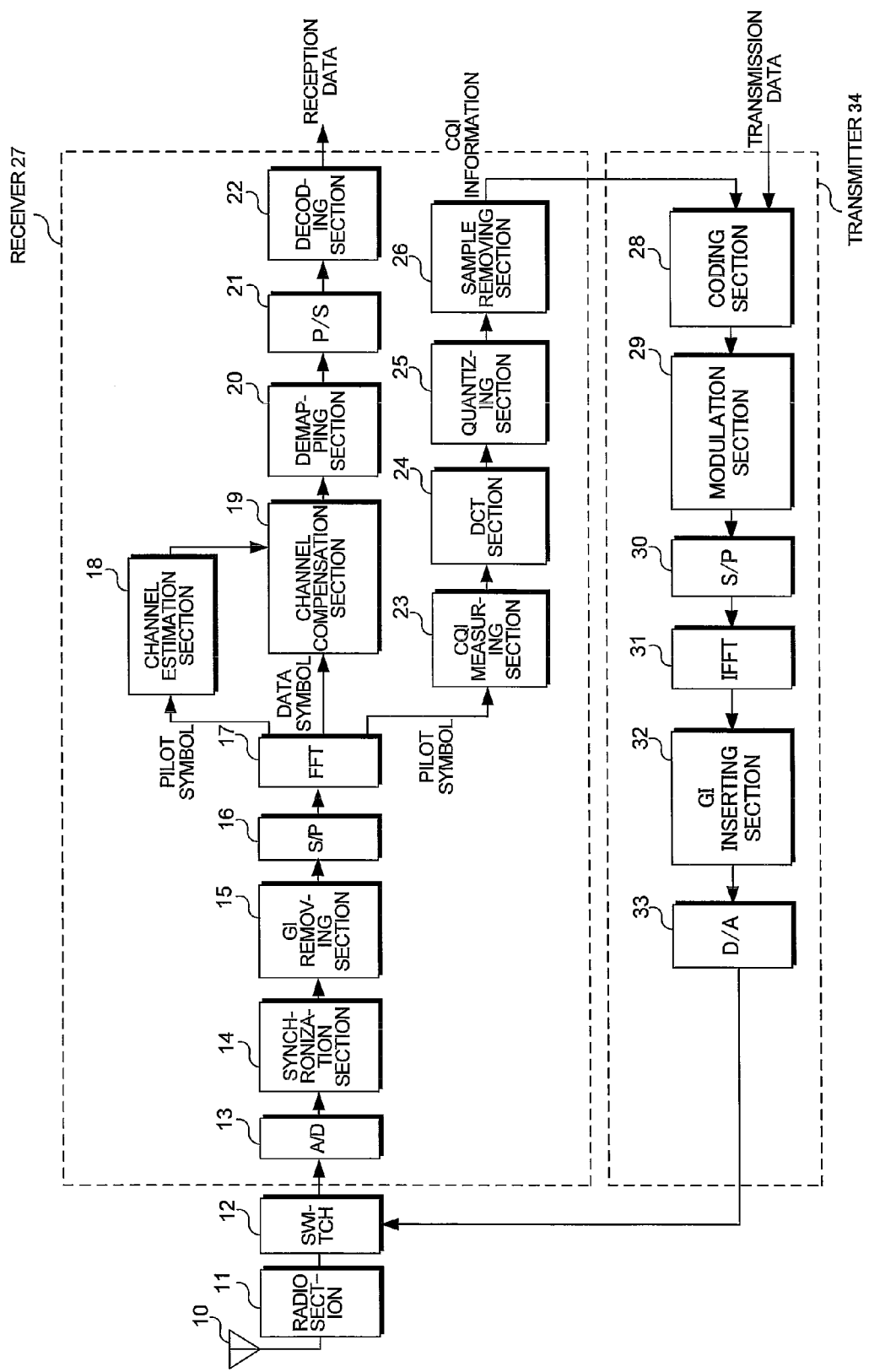
FIG. 4 is a block diagram showing an example of a transmitting/receiving configuration of a communication apparatus for notifying CQI information in Embodiment 1.

Configurations of communication apparatuses in this Embodiment will be described below. First described is the configuration of the side (terminal, communication terminal apparatus) for notifying (transmitting) the feedback information. FIG. 4 is a block diagram of an example of the transmitting/receiving configuration of the communication apparatus for notifying the CQI information in Embodiment 1. In addition, this Embodiment shows an example of sending back only part of samples as feedback. As shown in FIG. 4, the communication apparatus for compressing the CQI feedback amount according to this Embodiment is provided with an antenna section 10, radio section 11, switch 12, receiver 27, and transmitter 34. The receiver 27 has an A/D (Analog to Digital) conversion section (A/D) 13, synchronization section 14, GI (Guard Interval) removing section 15, S/P (Serial to Parallel) transform section (S/P) 16, FFT (Fast Fourier Transform) section (FFT) 17, channel estimation section 18, channel compensation section 19, demapping section 20, P/S (Parallel to Serial) transform section (P/S) 21, decoding section 22, CQI measuring section (reception quality measuring section) 23, DCT section (Discrete Cosine Transform section) 24, quantizing section 25, and sample removing section 26. Further, the transmitter 34 has a coding section 28, modulation section 29, S/P transform section 30, IFFT (Inverse FFT) section (IFFT) 31, GI inserting section 32 and D/A (Digital to Analog) conversion section (D/A) 33.

Each component of the communication apparatus as shown in FIG. 4 will be described below according to the processing flow. In receiving a packet transmitted from the communication apparatus of the communicating destination, in the terminal as shown in FIG. 4, a signal received in the antenna section 10 is converted in the radio section 11 into a signal with the frequency enabling A/D conversion. The signal is converted into a digital signal in the A/D conversion section 13 via the switch 12. Next, the synchronization section 14 establishes symbol synchronization, the GI removing section 15 removes a GI for each symbol, and the signal in the time domain is transformed into a signal in the frequency domain in the FFT section 17 via the S/P transform section 16. A data symbol converted into the signal in the frequency domain in the FFT section 17 is output to the channel compensation 19, and a pilot symbol for channel estimation is output to the channel estimation section 18 and CQI measuring section 23.

The channel estimation section 18 performs channel estimation using the pilot symbol known between the transmission (terminal) and reception (base station), and outputs the calculated channel estimation value to the channel compensation section 19. The data symbol is subjected to channel compensation in the channel compensation section 19, and demapped in the demapping section 20, and then, decoding and reproduction of data is performed in the decoding section 22 via the P/S transform section 21.

Meanwhile, the CQI measuring section 23 measures the CQI (received SNR) of each subcarrier from the received pilot symbol. Next, the DCT section 24 performs DCT processing on the measured CQI (reception quality information) of each subcarrier. The quantizing section 25 expresses a value obtained by quantizing (digitalizing) a signal component of each sample subjected to the DCT processing using the different numbers of bits for each sample (each sample group) as described previously.

The sample removing section 26 deletes samples (in this Embodiment, the 65th and subsequent samples) for which feedback is not performed. Thus generated signals of 64 samples are sent back as the CQI information (feedback information) to the communication apparatus of the communicating destination.

Next, the coding section 28 of the transmitter 34 receives the CQI information generated in the receiver 27 as well as transmission data. The coding section 28 performs forward error correction and coding on the information, and modulation section 29 modulates the resultant. Then, the signal in the frequency domain is transformed into a signal in the time domain in the IFFT section 31 via the S/P transform section 30, and given a guard interval in the GI inserting section 32. Then, the digital signal is converted into an analog signal in the D/A conversion section 33, passed through the switch 12, converted into a signal with the frequency enabling transmission thereof in the radio section 11, and transmitted to the communication apparatus of the communicating destination from the antenna section 10.

Figure 5:
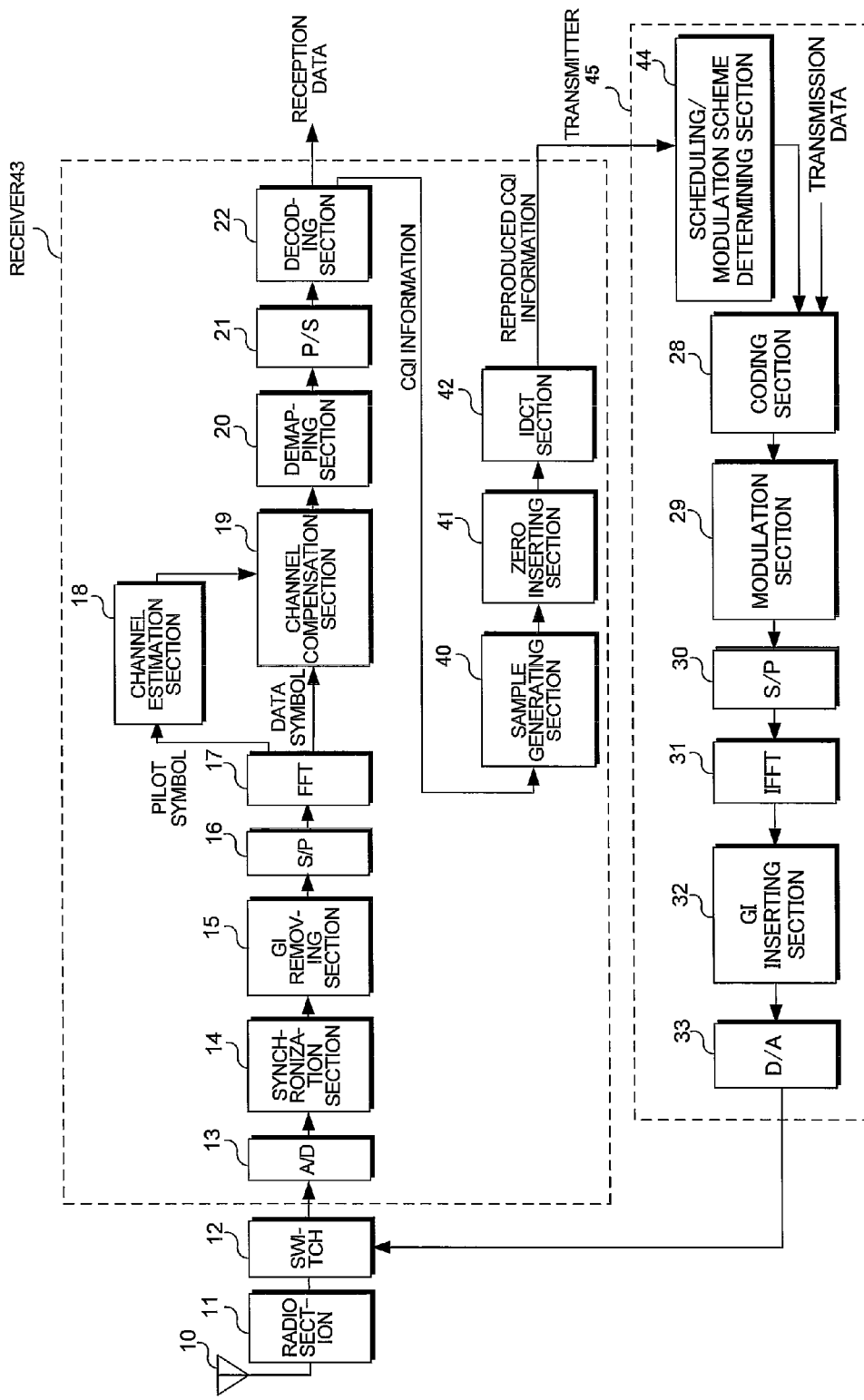
FIG. 5 is a block diagram showing an example of a transmitting/receiving configuration of a communication apparatus for receiving notification of the CQI information in Embodiment 1.

The configuration of the side (base station, communication control section) for receiving the feedback information will be described below. FIG. 5 is a block diagram showing an example of the transmitting/receiving configuration of the communication apparatus for receiving notification of the CQI information in Embodiment 1. In addition, blocks for performing the same operation as in the communication apparatus as shown in FIG. 4 are assigned the same reference numerals, and specific descriptions thereof are omitted. As shown in FIG. 5, the communication apparatus for receiving the CQI information compressed by this Embodiment has an antenna section 10, radio section 11, switch 12, receiver 43 and transmitter 45. The CQI information decoded in the receiver 43 is transformed in a sample generating section 40 from the information represented by bits (digital) to a sample value. In this Embodiment, the number of samples for feedback and the number of bits for representing each sample are known between the transmitting (terminal) and receiving (base station) sides, and the decoded bit sequence is properly divided into bits representing each sample to generate 64 samples.

Then, a zero inserting section 41 inserts zero in sample positions of the 65th and subsequent samples deleted in the communication apparatus as shown in FIG. 4. The IDCT section (Inverse Discrete Cosine Transform section) 42 performs IDCT processing on the zero-inserted CQI information, and it is possible to reproduce the CQI information of each subcarrier sent back from the communication apparatus as shown in FIG. 4. Then, the reproduced CQI information of each subcarrier is output to a scheduling/modulation scheme determining section 44, and used in determining scheduling, modulation scheme, coding rate and the like, and the determined scheduling result, modulation scheme and coding rate are used in transmitting a next packet.

By configuring as described above, and allocating the different number of bits for each sample (each sample group) as shown in FIG. 3, in the communication system for performing DCT processing on the CQI information to send back, it is possible to greatly compress the feedback information, while suppressing the error in reproducing the CQI information.

Figure 6:
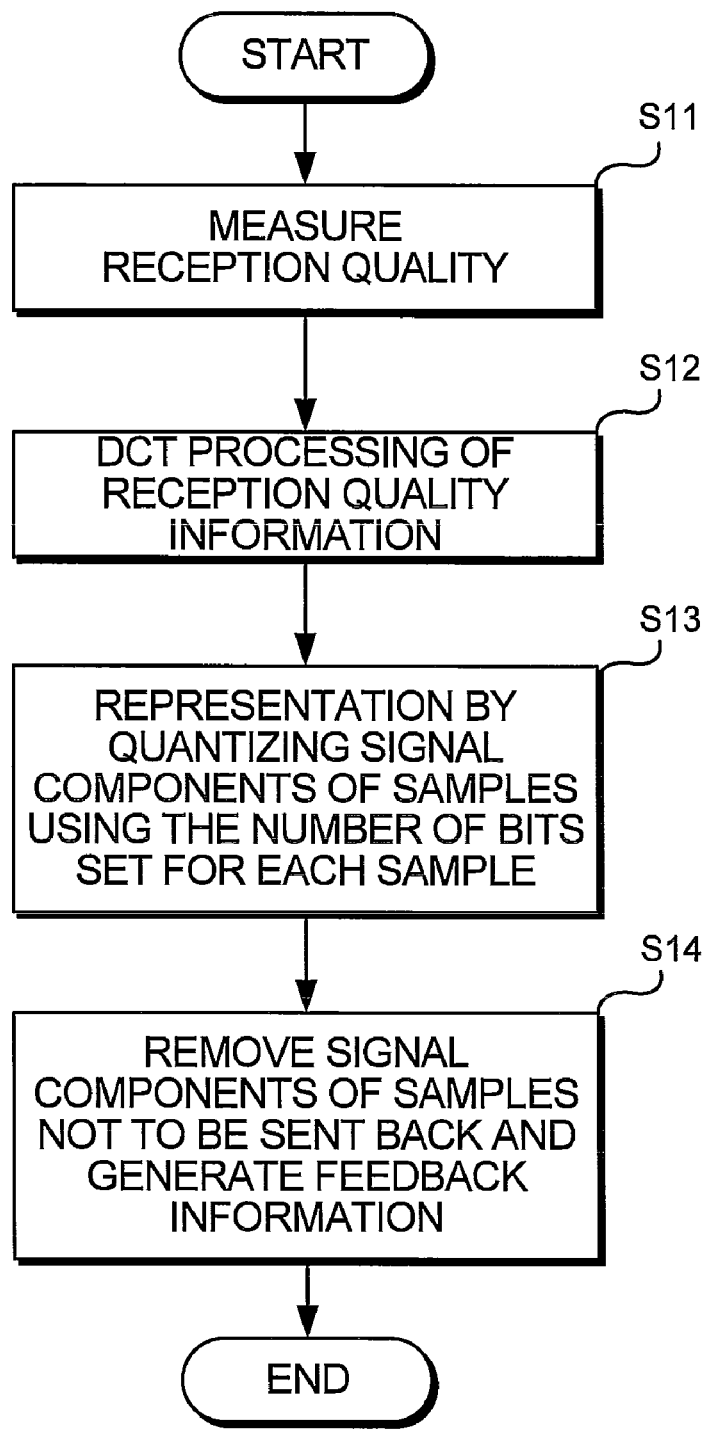
FIG. 6 is a flowchart showing an example of the operation for generating feedback information in Embodiment 1.
Figure 7:
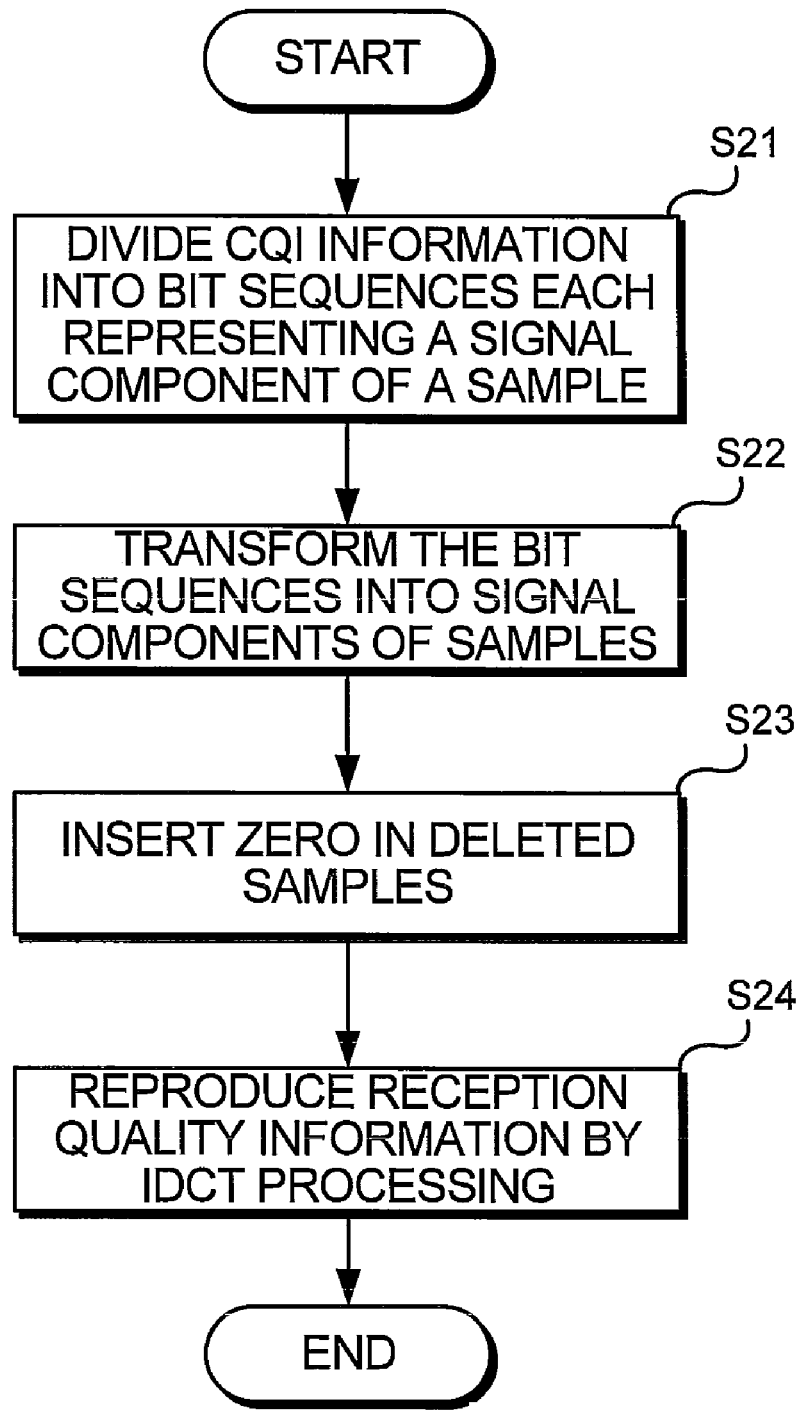
FIG. 7 is a flowchart showing an example of the operation for reproducing the reception quality information from the notified feedback information in Embodiment 1.

The generation of the feedback information and the reproduction of the reception quality information will be described below with reference to drawings. FIG. 6 is a flowchart showing an example of the operation for generating the feedback information in this Embodiment, and FIG. 7 is a flowchart showing an example of the operation for reproducing the reception quality information from the notified feedback information in this Embodiment.

The generation of the feedback information will be described first with reference to FIGS. 4 and 6. The CQI measuring section 23 measures the CQI (received SNR) of each subcarrier based on the received pilot symbol input from the FFT section 17 (step S11). An example of the reception quality measurement result becomes a waveform as shown in FIG. 1. Next, the DCT section 24 performs DCT processing on the measured CQI (reception quality information) of each subcarrier (step S12). An example of DCT-processed sample values becomes a waveform as shown in FIGS. 2 and 3.

The quantizing section 25 quantizes the signal component of each sample using the number of bits beforehand set for each sample group (step S13). The quantizing section 25 holds the beforehand set number of samples (the number of feedbacks) for feedback, and the numbers of bits set for each sample. For example, for the number of bits for each sample, in the case of FIG. 3, as "sample number-the numbers of bits" information of a combination of the sample number and the number of bits, the section 25 holds "16-12, 32-10, 48-8, 64-6". Then, the section 25 quantizes the first to 16th samples by 12 bits, and the 17th to 32nd samples by 10 bits. Further, the section 25 quantizes the 33rd to 48th samples by 8 bits, and the 49th to 64th samples by 6 bits. Furthermore, the 65th and subsequent samples do not undergo feedback in the example of FIG. 3, and therefore, may be quantized by the same or the lower number of bits as/than that of the 64th sample, or may under go processing for outputting an input value without performing quantization in the quantizing section 25.

The sample removing section 26 deletes samples for which feedback is not performed (step S14). The sample removing section 26 beforehand holds the number of samples for feedback, and for example, in the example in FIG. 3, deletes the 65th and subsequent samples. In this way, signal components of 64 samples are generated as the CQI information (feedback information).

The reproduction of the reception quality information will be described below with reference to FIGS. 5 and 7. The sample generating section 40 transforms the CQI information input from the decoding section 22 from the information represented by bits (digital) to a signal component of each sample. More specifically, the sample generating section 40 properly divides a bit sequence of the CQI information decoded in the receiver 43 into bit sequences (one or more bit groups) representing each sample (each of 64 samples) (step S21), and transforms each of divided bit sequences to reproduce signal components of 64 samples (step S22). In addition, as in the quantizing section 25, the sample generating section 40 holds the number of samples for feedback and the number of bits for representing each sample.

The zero inserting section 41 inserts zero in the sample positions of the 65th and subsequent samples deleted by the sample removing section 26 (step S23). The zero inserting section 41 performs insertion of zero corresponding to the number of IDCT points minus the number of feedback samples. The IDCT section 42 performs IDCT processing on the CQI information in which zero is inserted by the zero inserting section 41, and reproduces (decompresses) the CQI (reception quality information) of each subcarrier from the received feedback information (step S24).

In the system using adaptive modulation and adaptive scheduling, it is necessary to send back reception conditions (reception quality information) of the receiving side to the transmitting side as feedback, and in this Embodiment, the information amount is compressed by devising allocation of the number of bits for representing a signal component of each sample (DCT-processed sample value) obtained by performing DCT processing on the reception quality information as described above. By setting the number of bits for representing a signal component of each sample based on the level of the signal component of the DCT-processed sample, it is possible to compress the information amount, while suppressing the occurrence of an error in reproducing the feedback information. Since an absolute value of the signal component of the DCT-processed sample increases in the low-frequency region, the number of bits to allocate to samples with low frequencies is made higher than in the samples with high frequencies, and it is intended to compress the information amount using the different numbers of bits among samples.

In addition, in this Embodiment, the information (reception quality information, CQI information) to send back to the transmitting side as the CQI is the information subjected to transform based on the measurement result obtained by measuring received SNR or received SINR of each carrier, but alternately, may be average received SNR or average received SINR of subcarriers in a group after grouping subcarriers in some number, or may be average received SNR or average received SINR for each resource block in the OFDMA system.

Embodiment 2

Figure 8:
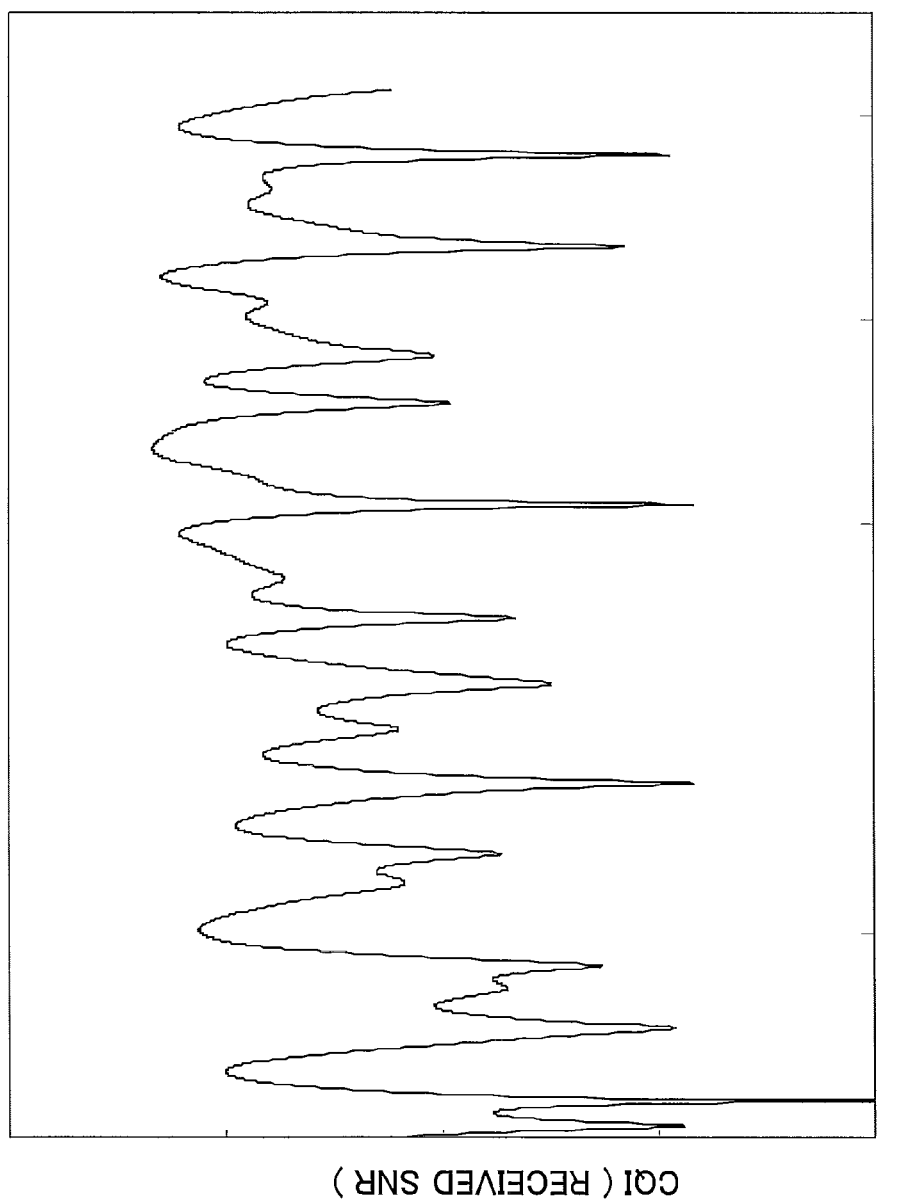
FIG. 8 is a diagram showing an example of the reception quality information when delay spread of the channel is large as compared with FIG. 1.
Figure 9:
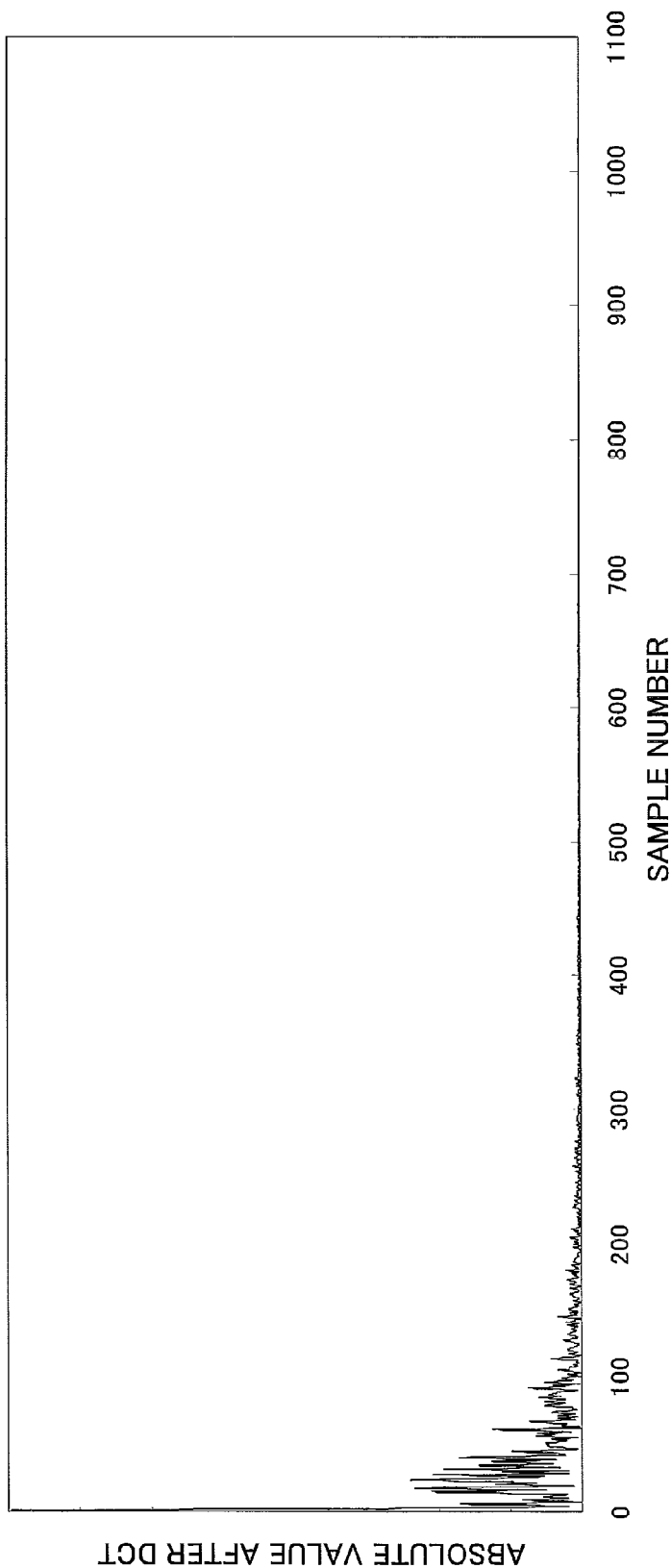
FIG. 9 is a diagram showing an example of a result of performing DCT processing on the reception quality information as shown in FIG. 8.
Figure 10:
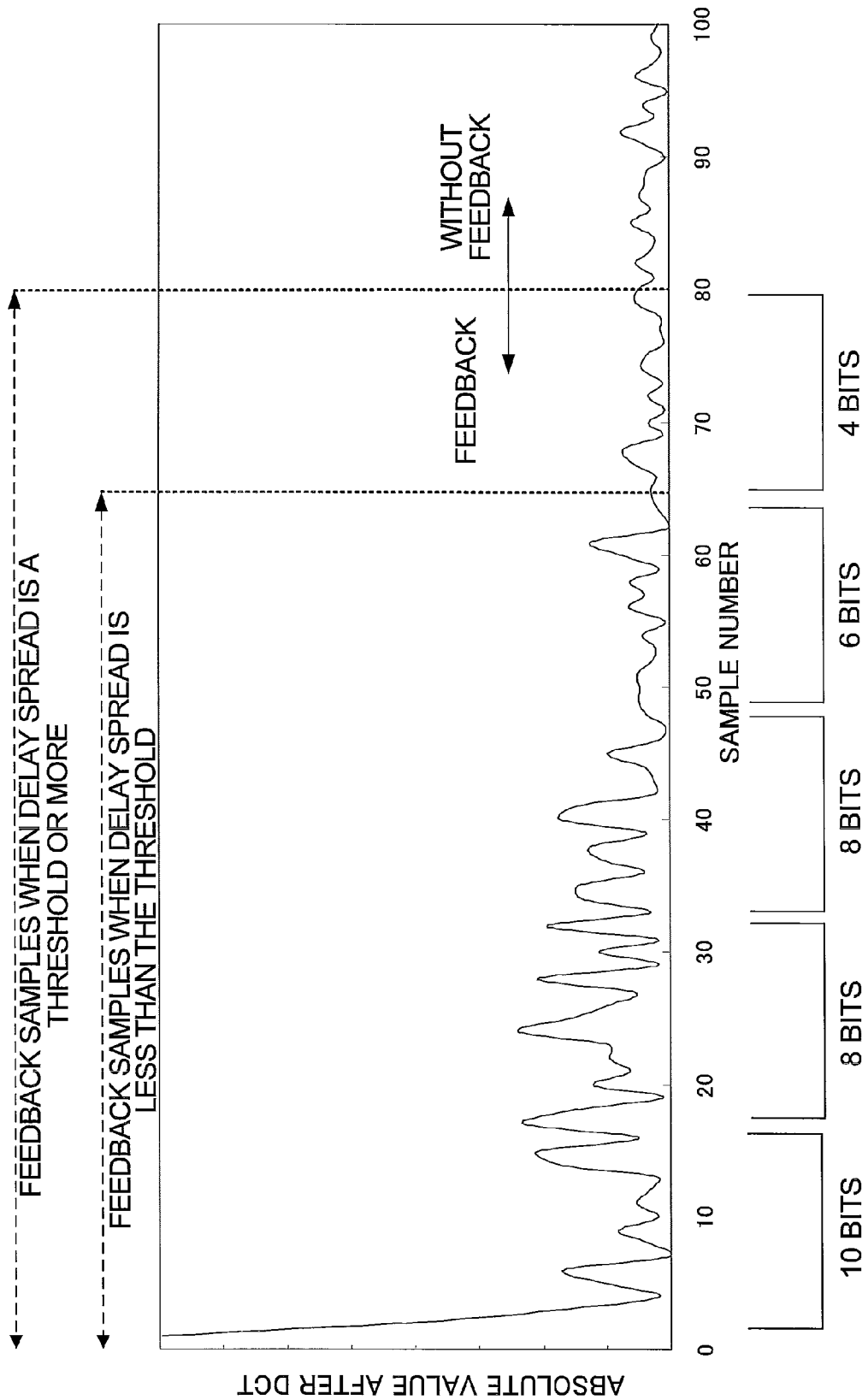
FIG. 10 is a diagram showing the enlarged result of sample numbers 0 to 100 in FIG. 9.

Embodiment 1 shows the techniques for representing DCT-processed samples with high-frequency components by the low number of bits, further deleting samples with high-frequency components, and thereby greatly reducing the feedback amount. When the delay spread of the channel is large, the variation in CQI in the frequency region is relatively intense. Accordingly, an absolute value of a DCT-processed signal component is a high (large) value in the signal component of a sample even in the high-frequency region. FIG. 8 is a diagram showing an example of the reception quality information when the delay spread of the channel is large. As compared with FIG. 1, the delay spread of the channel is large in FIG. 8. Further, FIG. 9 is a diagram showing an example of a result of performing DCT processing on the reception quality information as shown in FIG. 8, and FIG. 10 is a diagram showing enlarged results of sample numbers 0 to 100 in FIG. 9.

In such a case, deleting (without feedback) a DCT-processed signal component with the high frequency and a high sample value caused the occurrence of a significant error in reproducing the CQI information on the side of receiving the feedback information. Accordingly, when the delay spread of the channel is large, it is desired not to delete signal components with high frequencies of the DCT-processed signal as much as possible. However, an increase in the number of samples for feedback extremely increases the CQI feedback amount.

Therefore, in this Embodiment, further, in the case where the delay spread of the channel is a beforehand determined threshold or more, the number of bits for representing a signal component with the low frequency is decreased, and the decreased bits are allocated to a signal component with the high frequency. In other words, some combinations (the numbers of quantization bits) of the numbers of bits for representing each sample (each sample group) are beforehand set, and based on the delay spread of the channel, the CQI information is generated as feedback, using one of a plurality of combinations of the numbers of bits. The number of quantization bits is information for specifying the number of bits (the information amount) in each sample (each sample group) to quantize and express a result (a DCT-processed sample value or a signal component of a DCT-processed sample) of performing DCT processing on the reception quality information. At least two kinds are defined, and for example, the first number of quantization bits and the second number of quantization bits are separately used based on the delay spread of the channel. The number of quantization bits may include the number of samples (the number of samples for feedback).

By this means, without varying the total number of bits (the feedback information amount) for feedback, it is possible to also send back signal components with high frequencies with high accuracy as feedback.

More specifically, when the delay spread of the channel is less than some threshold, 64 samples undergo feedback with the numbers of bits as shown in FIG. 3, and when the delay spread of the channel is the threshold or more, 80 samples undergo feedback with the numbers of bits as shown in FIG. 10. By this means is performed the processing for performing feedback corresponding to 80 samples that are 16 samples more than in FIG. 3. At this point, as shown in FIG. 10, in the DCT-processed signal, the first to 16th samples are represented by 12 bits, and the 17th to 32nd samples are represented by 8 bits. The 33rd to 64th samples are represented by 8 bits that is the same as in FIG. 3, and the 65th to 80th samples are newly represented by 4 bits. In addition, as in Embodiment 1, the steps to quantize are constant. The total number of bits required in this case is 576, and the same number of bits undergoes feedback as in the case of 64 samples undergoing feedback as shown in FIG. 3. By adjusting the number of bits for representing a signal component of each sample, it is possible to notify the CQI information corresponding to the channel conditions without increasing the feedback information amount, and to reduce the reproduction error of the CQI information even in the propagation conditions with large delay spread.

Figure 11:
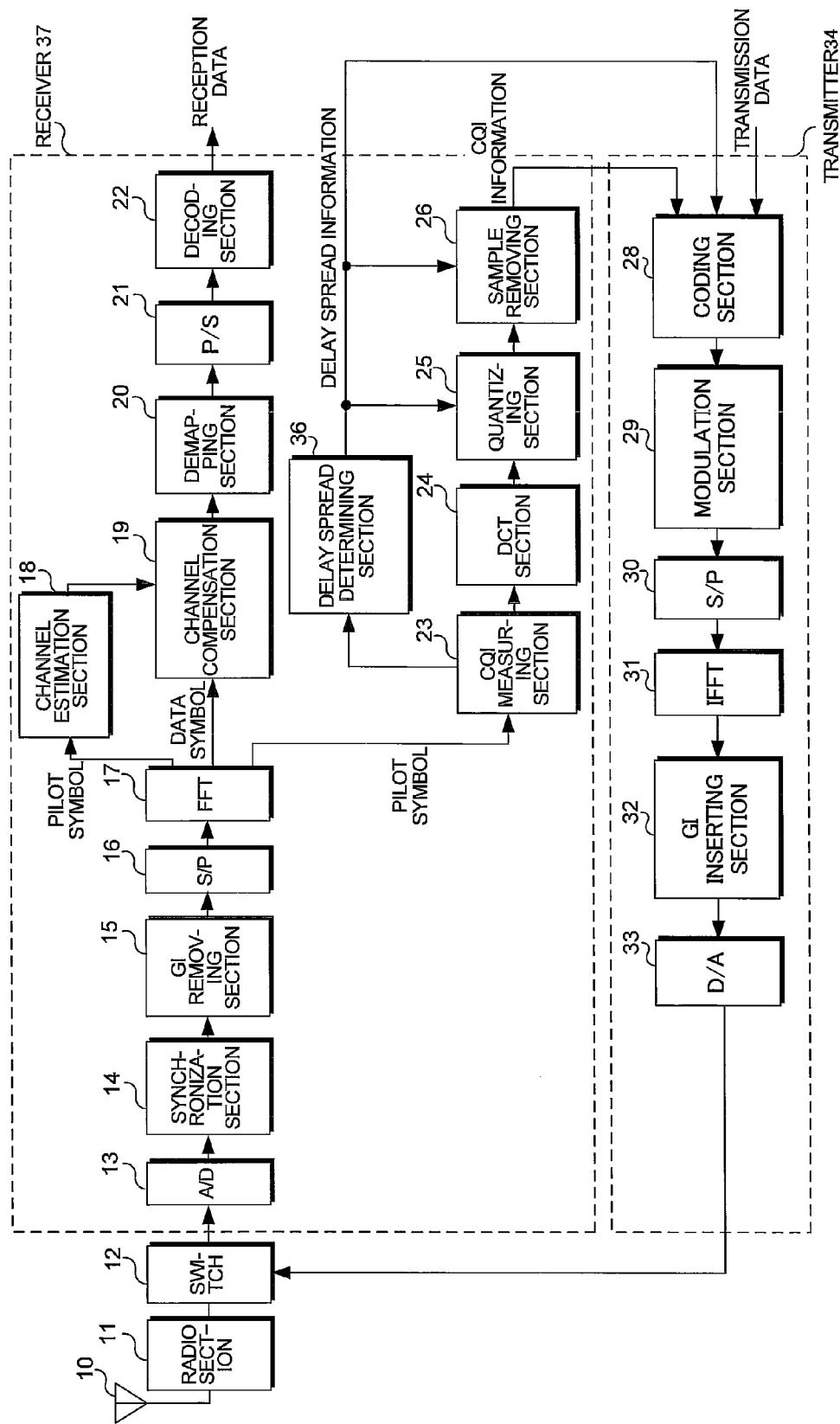
FIG. 11 is a block diagram showing an example of a transmitting/receiving configuration of a communication apparatus for notifying CQI information in Embodiment 2.
Figure 12:
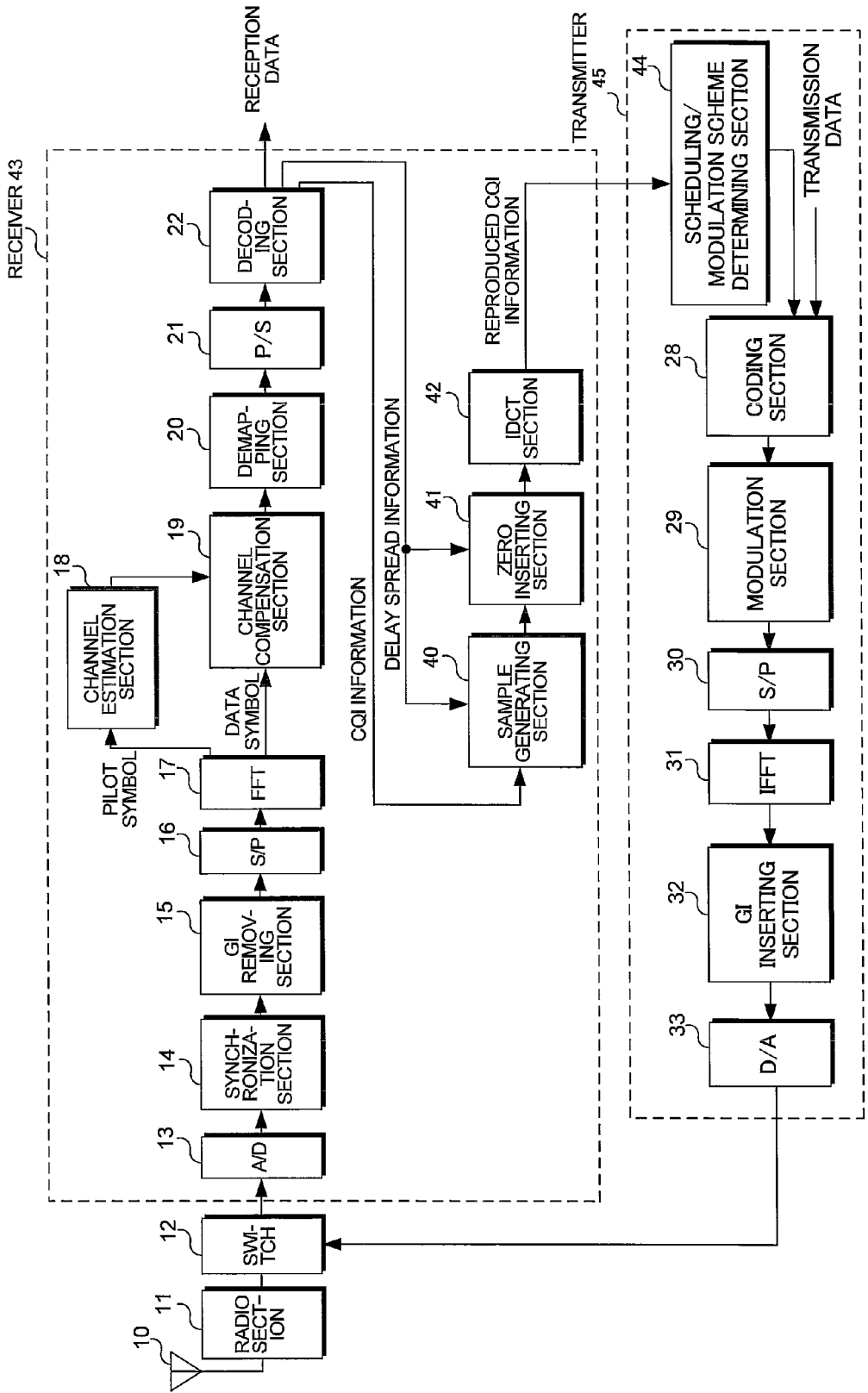
FIG. 12 is a block diagram showing an example of a transmitting/receiving configuration of a communication apparatus for receiving notification of the CQI information in Embodiment 2.

Described below are configurations of communication apparatuses in this Embodiment. FIG. 11 is a block diagram showing an example of a transmitting/receiving configuration of a communication apparatus for notifying the CQI information in Embodiment 2, and FIG. 12 is a block diagram showing an example of the transmitting/receiving configuration of a communication apparatus for receiving notification of the CQI information in Embodiment 2. In other words, FIG. 11 shows the apparatus configuration on the side (terminal) of performing feedback of the CQI, while FIG. 12 shows the apparatus configuration on the side (base station) of receiving the feedback information. As shown in FIG. 11, the configuration on the side of performing feedback in this Embodiment is a configuration having a receiver 37 such that the configuration of the receiver 27 as shown in FIG. 4 is provided with a delay spread determining section 36. The respects differing from FIG. 4 will be mainly described below.

The delay spread determining section 36 is a block for estimating delay spread of the channel from the variation in CQI of each subcarrier measured in the CQI measuring section 23, and notifying the information (delay spread information) about the estimated delay spread to the quantizing section 25, sample removing section 26 and coding section 28. Herein, in this Embodiment, the information about the estimated delay spread is only required to be information indicating whether or not the estimated delay spread is a threshold or more. Further, as the method of estimating the delay spread in the delay spread determining section 36, some methods are considered, and for example, such an easy method is allowed that estimation is made by counting the number of subcarriers that is an interval between subcarriers below predetermined CQI.

The quantizing section 25 holds the first number of quantization bits used in the case that the delay spread is less than a predetermined threshold, and the second number of quantization bits used in the case that the delay spread is the predetermined threshold or more. Herein, as an example, it is assumed to hold the number of quantization bits as shown in FIG. 3 as the first number of quantization bits, and the number of quantization bits as shown in FIG. 10 as the second number of quantization bits. More specifically, as described previously, the quantization bits as shown in FIG. 3 are 12 bits for the first to 16th samples, 10 bits for 17th to 32nd samples, 8 bits for 33rd to 48th samples, and 6 bits for 49th to 64th samples. Further, the quantization bits as shown in FIG. 10 are 10 bits for the first to 16th samples, 8 bits for 17th to 32nd samples, 8 bits for 33rd to 64th samples, and 4 bits for 65th to 80th samples. Based on the estimation result of the delay spread in the delay spread determining section 36, the quantizing section 25 selects the first number of quantization bits or the second number of quantization bits to set the number of quantization bits.

The sample removing section 26 holds the first number of samples (the number of feedback samples) (for example, "64" as shown in FIG. 3) used in the case that the delay spread is less than a predetermined threshold, and the second number of samples (for example, "80" as shown in FIG. 10) used in the case that the delay spread is the predetermined threshold or more, and separately uses the first number of samples and the second number of samples based on the delay spread information as in the quantizing section 25.

Further, the delay spread information generated in the delay spread determining section 36 is required in reproducing the CQI information in the communication apparatus of the feedback destination, and should be sent back together with the CQI information. Therefore, the delay spread information is encoded in the coding section 28 together with the transmission data. However, as described previously, the delay spread information is only required to be information indicating whether or not the estimated delay spread is a threshold or more i.e. to be information of 1 bit, and therefore, does not cause an increase in the feedback information to the extent that the transmission efficiency deteriorates.

Thus, the control based on the delay spread information is performed in the quantizing section 25 and sample removing section 26, and it is thereby possible to perform feedback corresponding to the channel conditions without increasing the feedback amount.

Next, as shown in FIG. 12, in the configuration on the side of receiving the feedback information in this Embodiment, the receiver 43 differs from the receiver 43 in FIG. 5 in the respect that the decoding section 22 inputs the demodulated delay spread information to the sample generating section 40 and zero inserting section 41. The respect differing from FIG. 5 will be mainly described below.

As in the quantizing section 25 of FIG. 11, the sample generating section 40 holds the first number of quantization bits and the second number of quantization bits, and based on the input delay spread information, suitably divides bits (bit group) allocated to each sample corresponding to whether or not the delay spread is the threshold or more to reproduce sample values undergoing feedback.

As in the sample removing section 26 of FIG. 11, the zero inserting section 41 holds the first number of samples ("64" as shown in FIG. 3) and the second number of samples ("80" as shown in FIG. 10), and corresponding to the delay spread information, controls the number of samples to insert zero. The control is that zero is inserted in samples with the sample numbers (the number of IDCT points-80) when the delay spread is the threshold or more, while being inserted in samples with the sample numbers (the number of IDCT points-64) when the delay spread is less than the threshold. The number of IDCT points is the number of all the samples to perform IDCT processing.

Thus, the control based on the delay spread information is performed in the sample generating section 40 and zero inserting section 41, and it is thereby possible to properly reproduce the CQI of each subcarrier even when the number of bits for representing each sample and the number of feedback samples are varied corresponding to the channel conditions.

Figure 13:
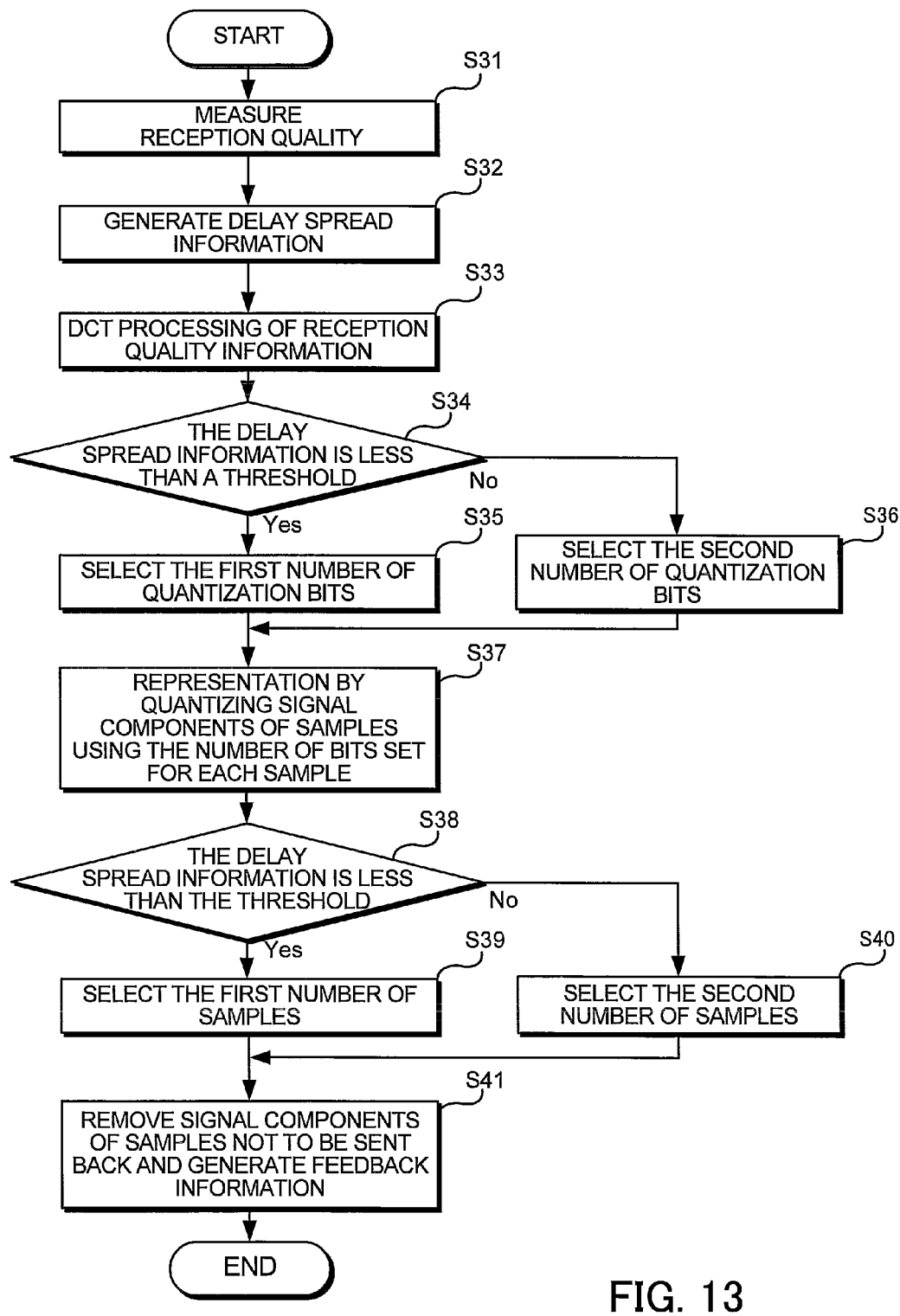
FIG. 13 is a flowchart showing an example of the operation for generating feedback information in Embodiment 2.
Figure 14:
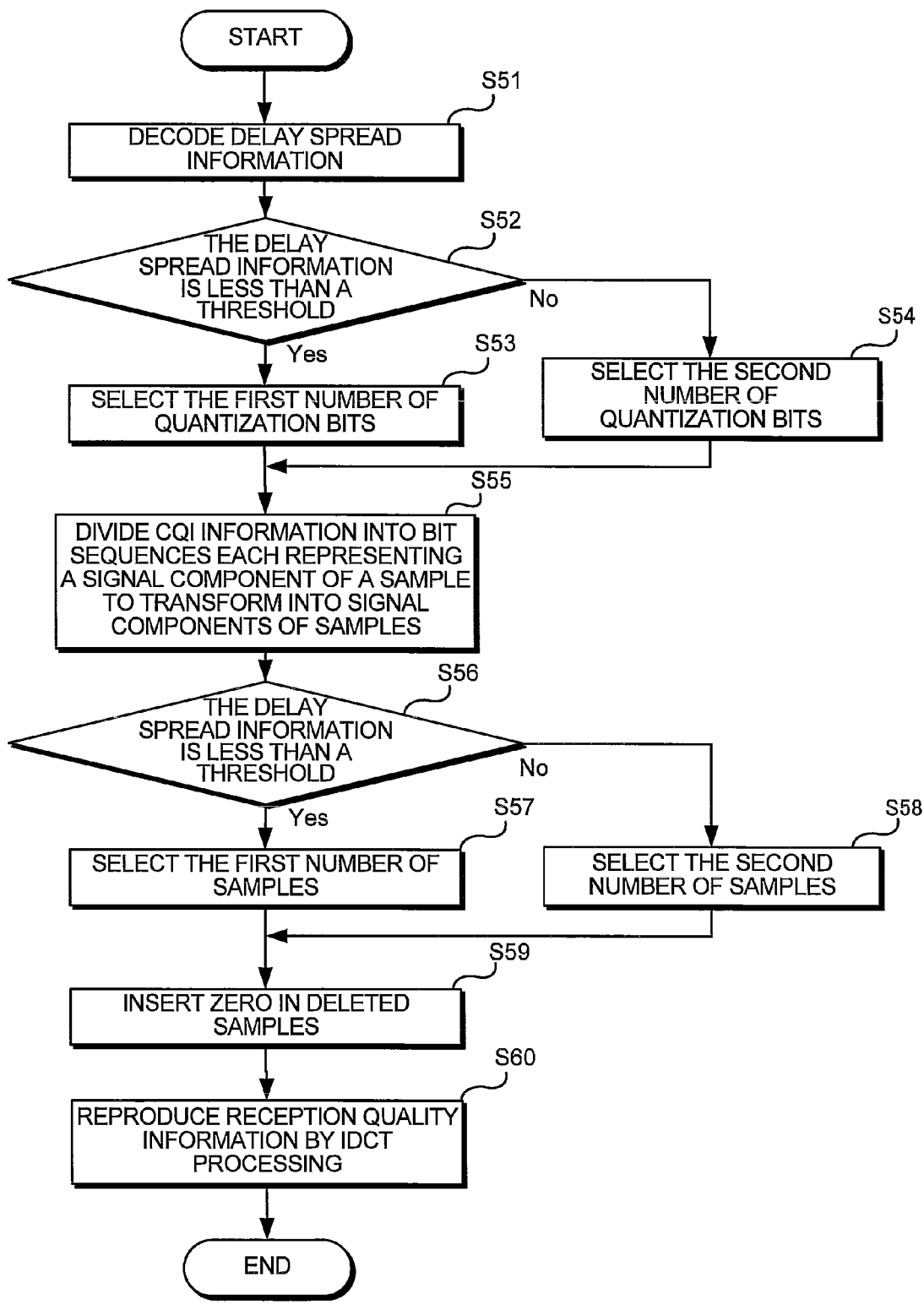
FIG. 14 is a flowchart showing an example of the operation for reproducing the reception quality information from the notified feedback information in Embodiment 2.

The generation of the feedback information and the reproduction of the reception quality information of this Embodiment will be described below with reference to drawings. FIG. 13 is a flowchart showing an example of the operation for generating the feedback information in Embodiment 2, and FIG. 14 is a flowchart showing an example of the operation for reproducing the reception quality information from the notified feedback information in Embodiment 2. The generation of the feedback information will be described first with reference to FIGS. 11 and 13. The CQI measuring section 23 measures the CQI (received SNR) of each subcarrier based on the received pilot symbol input from the FFT section 17 (step S31).

The delay spread determining section 36 estimates the delay spread of the channel from the variation in CQI of each subcarrier measured in the CQI measuring section 23, and notifies the information (delay spread information) about the estimated delay spread to the quantizing section 25, sample removing section 26 and coding section 28 (step S32). Further, the DCT section 24 performs DCT processing on the measured CQI (reception quality information) of each subcarrier (step S33). In FIG. 13 steps S32 and S33 are described sequentially, but the processing of steps S32 and S33 may be executed in parallel with each other, and both the processing is only required to be executed prior to the processing of step S34.

Next, the quantizing section 25 determines the delay spread information determined in the delay spread determining section 36, and selects the first number of quantization bits to set the number of quantization bits as shown in FIG. 3 (step S35) when the delay spread information is less than the threshold (Yes in step S34), while selecting the second number of quantization bits to set the number of quantization bits as shown in FIG. 10 (step S36) when the delay spread information is the threshold or more (No in step S34). The quantizing section 25 quantizes and expresses a signal component of each sample using the set number of quantization bits (step S37).

Based on the delay spread information determined in the delay spread determining section 36, the sample removing section 26 selects the first number of samples (step S39) when the delay spread information is less than the threshold (Yes in step S38), while selecting the second number of samples (step S40) when the delay spread information is the threshold or more (No in step S38). The sample removing section 26 removes signal components of samples (that do not undergo feedback) exceeding the selected number of samples to generate the feedback information (step S41).

The reproduction of the reception quality information will be described below with reference to FIGS. 12 and 14. The decoding section 22 decodes the delay spread information, and inputs the delay spread information to the sample generating section 40 and zero inserting section 41 (step S51). The sample generating section 40 determines the delay spread information input from the decoding section 22, and selects the first number of quantization bits to set the number of quantization bits as shown in FIG. 3 (step S53) when the delay spread information is less than the threshold (Yes in step S52), while selecting the second number of quantization bits to set the number of quantization bits as shown in FIG. 10 (step S54) when the delay spread information is the threshold or more (No in step S52). Based on the set number of quantization bits, the sample generating section 40 properly divides a bit sequence of the CQI information input from the decoding section 22 into bit sequences representing each sample based on the set number of quantization bits, and transforms each of divided bit sequences into the signal component of the sample (step S55).

The zero inserting section 41 determines the delay spread information input from the decoding section 22, and selects the first number of samples (step S57) when the delay spread information is less than the threshold (Yes in step S56), while selecting the second number of samples (step S58) when the delay spread information is the threshold or more (No in step S56). The zero inserting section 41 inserts zero in positions of samples deleted by the sample removing section 26 (step S59). The IDCT section 42 performs IDCT processing on the CQI information in which zero is inserted by the zero inserting section 41, and reproduces (decompresses) the CQI (reception quality information) of each subcarrier from the received feedback information (step S60).

Thus, by preparing some kinds of patterns of the number of quantization bits of samples for feedback and the number of such samples, it is possible to perform feedback adapted to the channel conditions. By this means, it is possible to control the number of samples for feedback corresponding to the delay spread of the channel, while keeping the feedback information amount constant.

In addition, this Embodiment describes the example of varying the number of samples for feedback corresponding to the delay spread of the channel, and alternately, such control may be performed that the number of samples for feedback is kept constant even in the channel with the large delay spread, and that only the number of bits for representing each sample is adjusted.

Further, in this Embodiment, two patterns (FIGS. 3 and 8) are prepared for the number of quantization bits of samples for feedback and the number of such samples, and made is only the determination on whether or not the delay spread is the predetermined threshold or more, but three or more kinds of combinations may be set for the number of quantization bits and the number of samples to vary the number of quantization bits in multiple stages based on the delay spread. In addition, the feedback information except the delay spread information is controlled to be constant. In such a case, the delay spread information requires the several-bit information instead of 1-bit information indicating whether or not the delay spread is a predetermined threshold or more, but the transmission efficiency does not deteriorate significantly.

Further, when the delay spread of the channel does not vary greatly, such control may be performed that the delay spread information is sent back once at the time of starting communications, or sent back regularly at intervals (longer than the feedback interval of the CQI) longer than in the above-mentioned Embodiment. Furthermore, when the delay spread of the channel is almost the same on downlink and uplink, the delay spread information may be estimated on the terminal side and base station side without being sent back.

Embodiment 3

Figure 15:
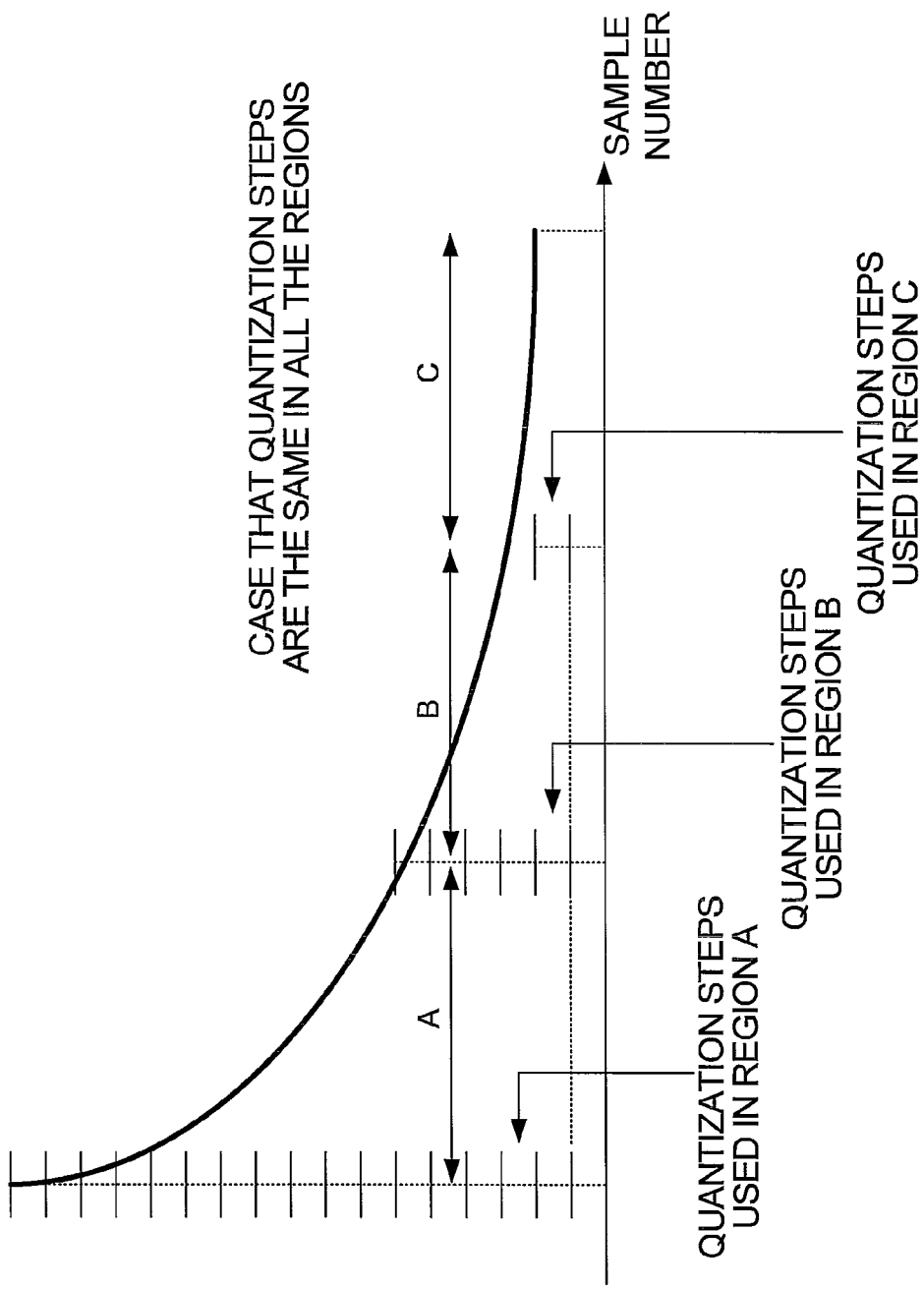
FIG. 15 is a diagram showing the summary of a method using different quantization steps in Embodiment 3.
Figure 16:
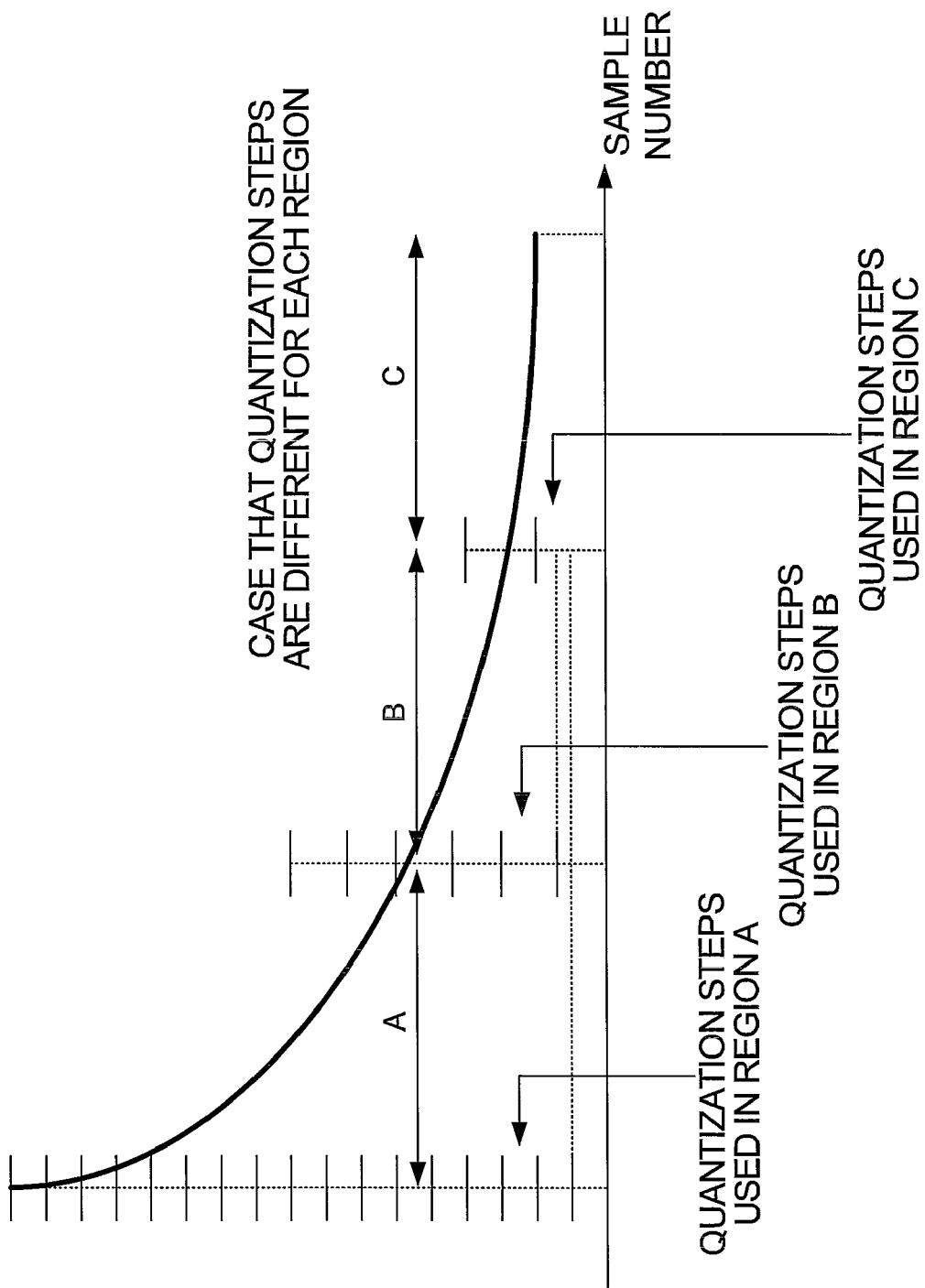
FIG. 16 is another diagram showing the summary of the method using different quantization steps in Embodiment 3.

In the above-mentioned Embodiments, the steps (resolution) are constant on all the samples. Embodiment 3 differs from the Embodiments, and is to quantize by different steps corresponding to the number of allocated bits. More specifically, in representing a DCT-processed sample, the step (resolution) is roughened, and adjustments are made to enable a value with a higher absolute value to be expressed while maintaining the number of bits. The summary of the method of thus using different quantization steps are shown in FIGS. 15 and 16. FIG. 15 shows the case that steps (resolution) of quantization are the same over the entire region, and FIG. 16 shows the case that steps of quantization used in regions A, B and C are different from one another. Herein, as an example, three regions A, B and C are provided, and the numbers of bits used in the regions are different from one another.

In the invention, in order to set the low number of bits to represent a DCT-processed signal in the high-frequency region, when the signal in the high-frequency region is quantized by the same steps (resolution) as the steps of a signal in the low-frequency region quantized by the higher number of bits, an error may occur due to the fact that a sample with a high absolute value cannot be expressed. In other words, as in the region C shown in FIG. 15, when the quantization steps are only up to the second step and there is a sample higher than the second step, the sample is regarded as being included in the second step, resulting in an error.

In contrast thereto, as shown in FIG. 16, in the region using the different number of bits, the setting is made to also vary the steps (resolution) to quantize, and it is thereby possible to reduce the error occurring due to the fact that a sample with a high absolute value cannot be expressed. In other words, as in the region C shown in FIG. 16, when the quantization steps are only two steps, when the steps are rougher than in the regions A and B, it is possible to express a sample with a high absolute value, and to reduce the error.

In addition, the steps (resolution) of quantization used in regions with the different numbers of bits to send back are beforehand determined, and known on both the transmitting (terminal) and receiving (base station) sides. Alternately, when the steps (resolution) to quantize are varied corresponding to the delay spread or the like as in Embodiment 2, the information about the steps (resolution) to quantize also needs to be sent back.

Figure 17:
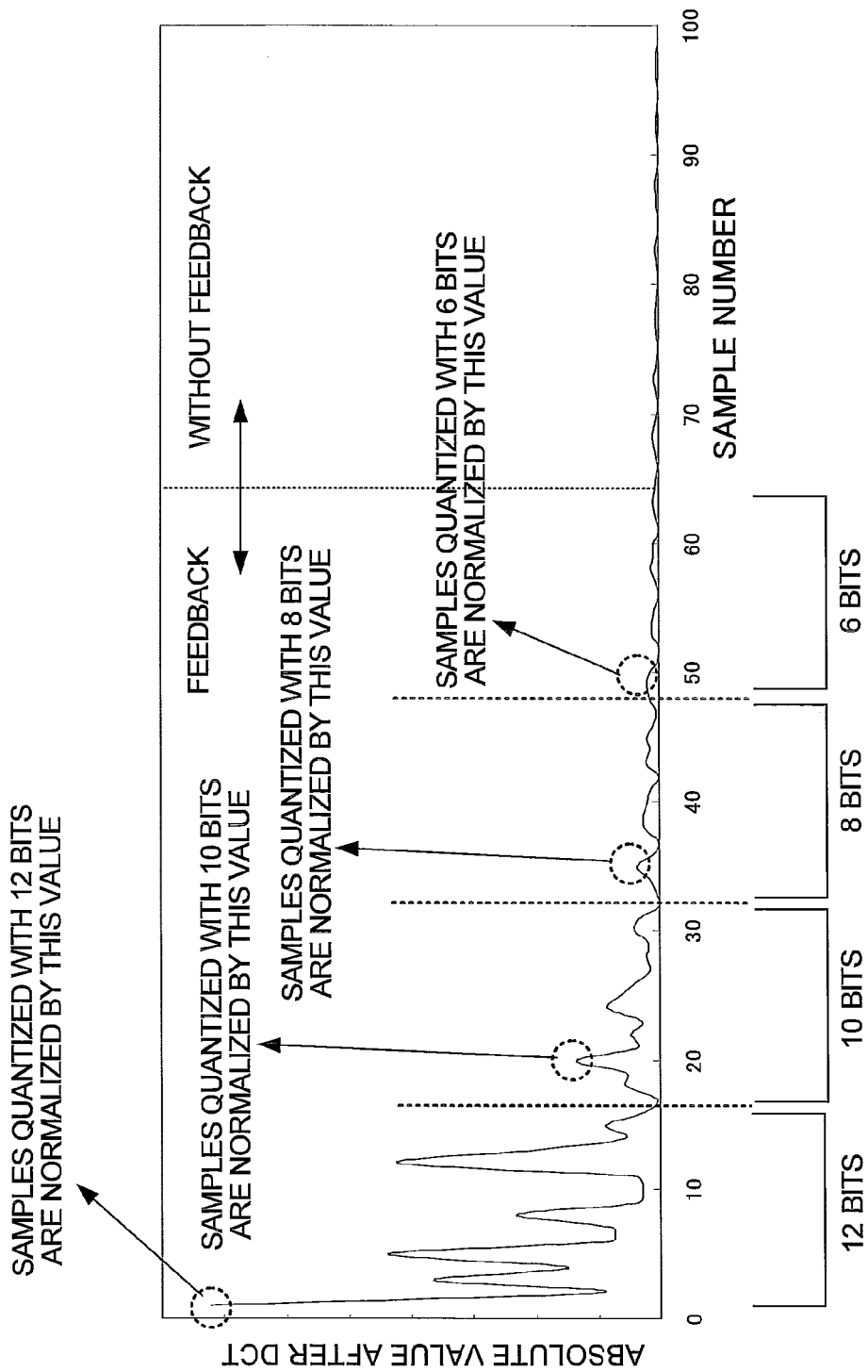
FIG. 17 is a diagram showing normalization in Embodiment 3.

As described above, in quantizing a DCT-processed signal, by setting not only the number of bits used in quantization but also quantization steps (resolution) at different values corresponding to the frequency (on whether a signal is in the lower-frequency region or higher-frequency region), it is possible to reduce the error caused by not expressing a sample with a high absolute value while maintaining the number of bits to send back. However, it is not always possible to express all the samples with high absolute values. Therefore, as shown below, a method may be used for normalizing samples in the region by an absolute value of a sample with the highest absolute value in the region for each region with the different number of bits used in quantization, and representing normalized signals by the number of bits usable in the region. The summary of this normalization is shown in FIG. 17. In addition, FIG. 17 shows absolute values of the same DCT processing result as in FIG. 3.

As shown in FIG. 17, each sample is normalized by a sample value with the highest absolute value in each sample group. By using such normalization, it is possible to represent all the samples with the number of bits set for each region. At this point, since samples with the absolute value between 0 and 1 are quantized by the different number of bits for each region, and therefore, as in the examples shown in FIGS. 15 and 16, the steps (resolution) to quantize are different between regions using the different numbers of bits. In addition, when such normalization is used, it is necessary to send back an absolute value of a sample used in normalization in each region to the base station side, and that the base station side multiples sample values in each region by the absolute value of the sample used in normalization in the region before performing IDCT processing. Meanwhile, in the case of performing such normalization, it is possible to express all the samples with high absolute values even when the number of bits used in quantization is the same in each region. Therefore, such a form may be provided that DCT-processed samples are divided into some regions (sample groups), the above-mentioned normalization is performed for each region, and that the samples of each region are quantized with the same number of bits.

Thus, even in the case where samples of each region are quantized with the same number of bits, since normalization is actually performed with a different value for each region, samples expressed by different resolutions for each region are obtained when the base station performs the processing of multiplying a feedback signal by a value used in normalization.

Figure 18:
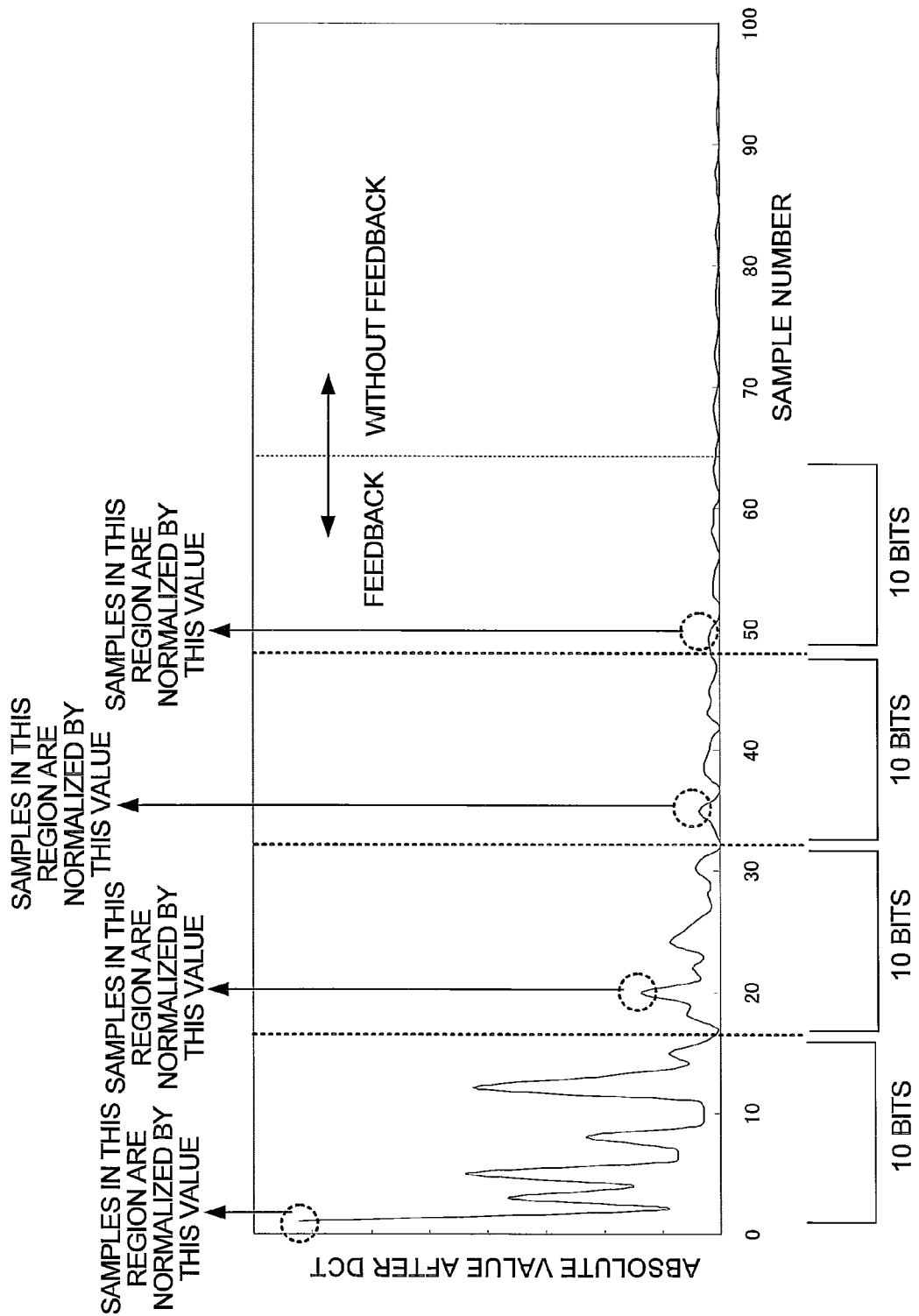
FIG. 18 is another diagram showing normalization in Embodiment 3.

FIG. 18 shows an example of such a case. Herein, the division as shown in FIG. 18 may be made by the number of samples beforehand determined for each region, or may be a form of varying the number of samples included in each region corresponding to the delay spread. In addition, when the number of samples for each region is varied corresponding to the delay spread, it is necessary to include the information about the number of samples in the feedback information for each packet or whenever varying.

Configurations of the transmitter and receiver according to Embodiment 3 are the same as in shown FIG. 4.

Figure 19:
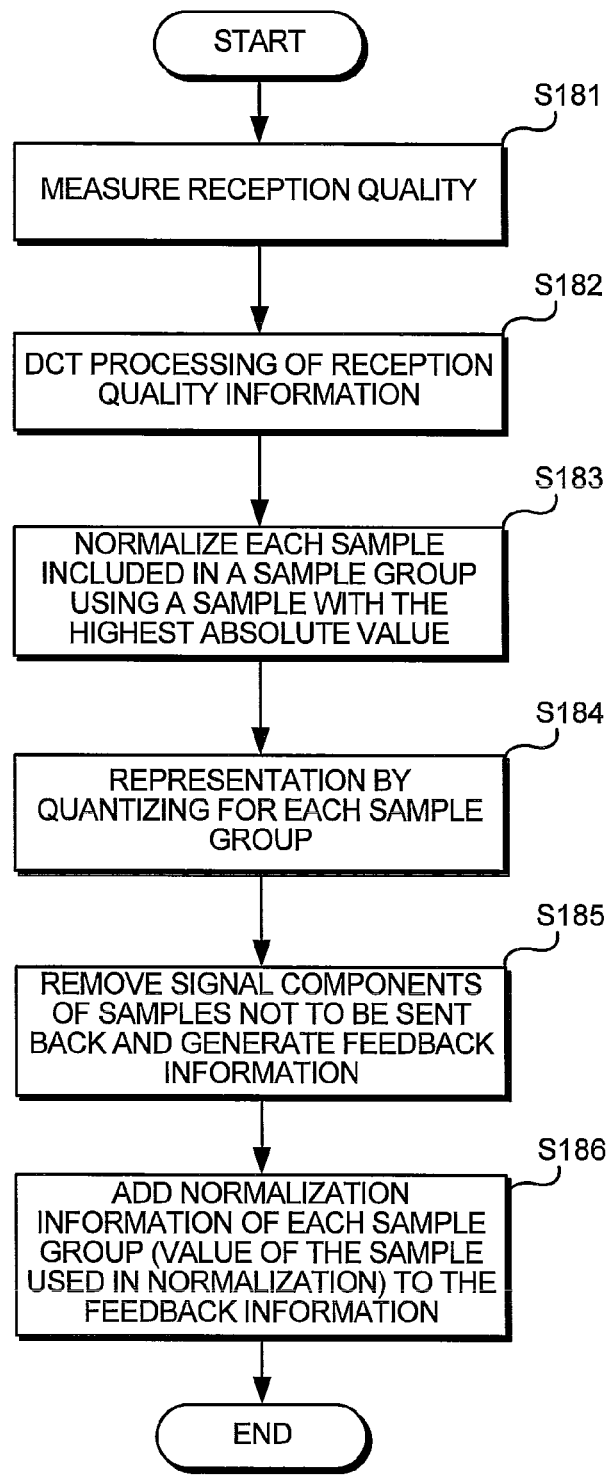
FIG. 19 is a flowchart showing an example of the operation for generating feedback information in Embodiment 3.

The generation of the feedback information and the reproduction of the reception quality information will be described below with reference to FIGS. 4 and 19. FIG. 19 is a flowchart showing an example of the operation for generating the feedback information in this Embodiment. The CQI measuring section 23 measures the CQI (received SNR) of each subcarrier based on the received pilot symbol input from the FFT section 17 (step S181). The reception quality measurement result becomes a waveform as shown in FIG. 1. Next, the DCT section 24 performs DCT processing on the measured CQI (reception quality information) of each subcarrier (step S182). The DCT-processed sample values become a waveform as shown in FIGS. 2 and 3.

The quantizing section 25 normalizes each sample included in the sample group using a sample with the highest absolute value (step S183). Next, the quantizing section 25 quantizes samples included in each sample group to represent (step S184). Herein, when quantization is performed with the different number of bits for each sample group, the quantizing section 25 holds the beforehand set number of samples (the number of feedbacks) for feedback, and the number of bits set for each sample. For example, for the number of bits for each sample, in the case of FIG. 3, as "sample number-the number of bits" information of a combination of the sample number and the number of bits, the section 25 holds "16-12, 32-10, 48-8, 64-6". Then, the section 25 quantizes the first to 16th samples by 12 bits, and the 17th to 32nd samples by 10 bits. Further, the section 25 quantizes the 33rd to 48th samples by 8 bits, and the 49th to 64th samples by 6 bits. Furthermore, the 65th and subsequent samples do not undergo feedback in the example of FIG. 3, and therefore, may be quantized by the same or the lower number of bits as/than that of the 64th sample, or may undergo processing for outputting an input value without performing quantization in the quantizing section 25. Moreover, in the case of performing normalization and quantization as shown in FIG. 18, the quantizing section 25 performs quantization using the same number of bits in each region.

The sample removing section 26 deletes samples for which feedback is not performed (step S185). The sample removing section 26 beforehand holds the number of samples for feedback, and for example, in the example in FIG. 3, deletes the 65th and subsequent samples. In this way, signal components of 64 samples are generated as the CQI information (feedback information). Then, to the feedback information is added the information (CQI normalization information) about the absolute value of the sample used in normalization in each region in the quantizing section 25 (step S186), and these pieces of feedback information are notified to the base station side. The normalization information is quantized as the other feedback information (CQI information), encoded, and notified to the base station side. The method regarding quantization at this point is not specified particularly, but includes the method of quantizing with the beforehand determined number of bits and resolution, and the like.

In addition, as the normalization method other than the above-mentioned method, normalization may be performed using the exponent of the maximum absolute value in each region. This method is effective in the case where each of DCT-processed samples is output with the exponent of x bits, mantissa of y bits indicative of a value, and sign bit of 1 bit indicative of positive or negative. When normalization is thus performed using only the exponent, the value of the mantissa of each sample is not varied, and the data position is varied. For example, when z is a difference between a value of the exponent of the highest absolute value, and a value of the exponent of a sample to be normalized, the mantissa of the sample to be normalized undergoes bit-shi by z bits so that the value decreases, and then, higher-order bits corresponding to the number of bits designated for each region are sent back. In the case of using such normalization, the error slightly increases due to quantization because normalization is not performed using the accurate maximum value, but since the value of the exponent used in normalization only needs feedback, it is possible to reduce the amount of feedback information about normalization. Further, since the normalization processing can be actualized only by bit-shift, it is also possible to reduce the circuit scale as compared with the case of normalizing with the accurate value.

Embodiment 4

This Embodiment shows another technique for reducing the feedback amount. More specifically, among DCT-processed samples, not only samples with high frequencies, but also a sample (first sample) with the lowest frequency is deleted not to perform feedback.

Thus, in the case of not performing feedback on the first sample subjected to DCT processing, in the example as shown in FIG. 3, it is possible to further reduce the feedback information of 12 bits. In addition, the possibility is high that the first sample subjected to DCT processing has the maximum absolute value among all the samples, and the problem arises that the CQI (reception quality information) cannot be reproduced properly by deleting this sample. Therefore, in this Embodiment, prior to DCT processing, performed is the processing of averaging CQIs (received SNRs) of all the subcarriers to calculate a CQI average value, and subtracting the CQI average value (average SNR, average reception quality information) of all the subcarriers from the measured CQI of each subcarrier.

Figure 21A:
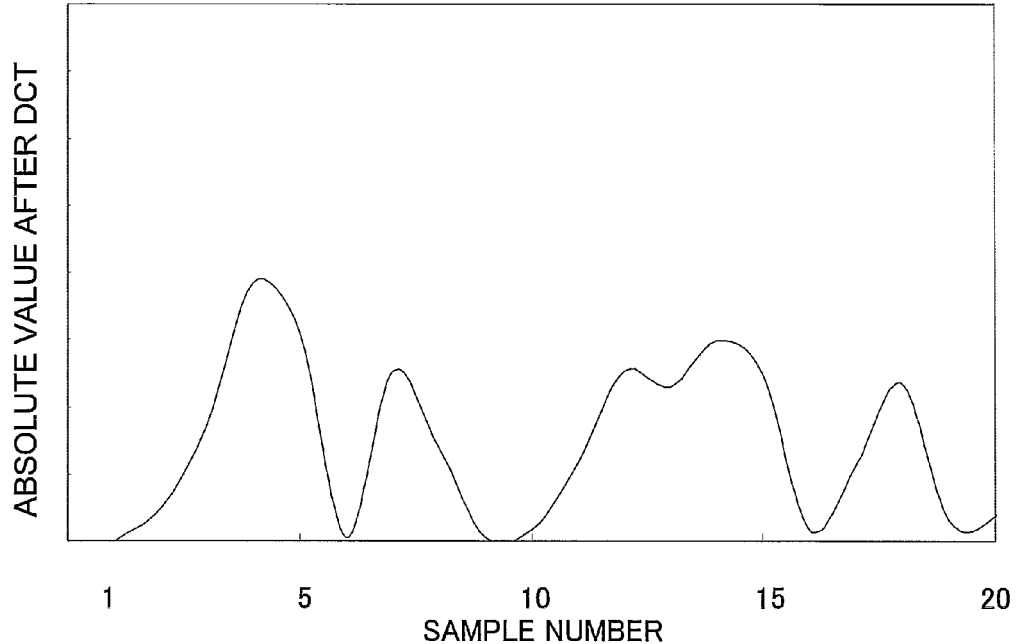
FIG. 21 A is a diagram showing a result in the low-frequency region of performing DCT processing on the reception quality information as shown in FIG. 20, where is a result of performing DCT processing with a CQI average value subtracted.
Figure 21B:
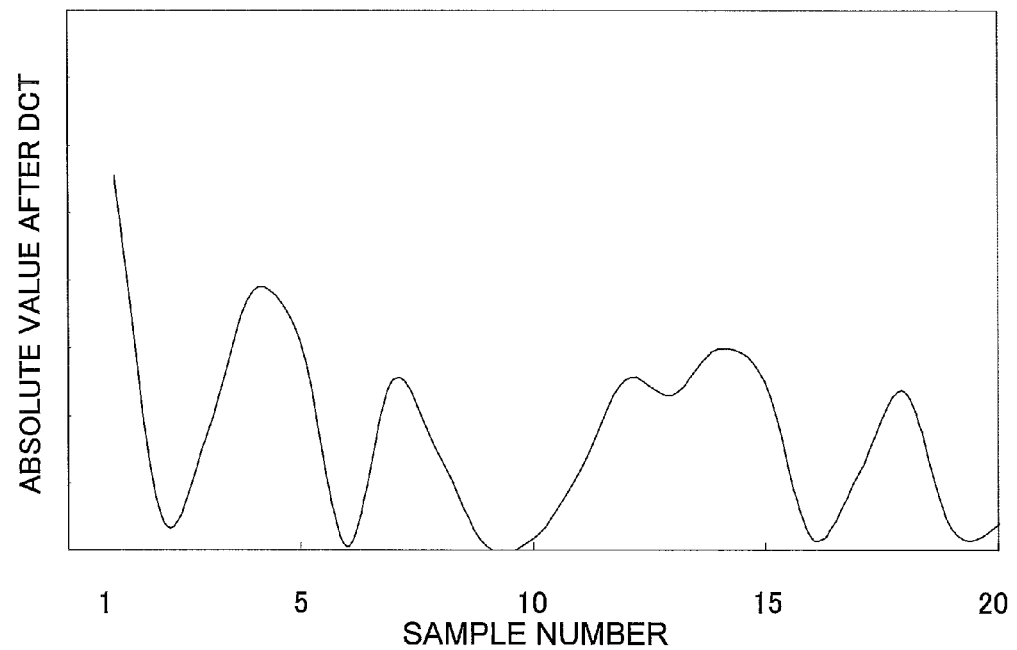

Using specific reception quality information, the case of subtracting the CQI average value is compared with the case of not subtracting to explain. FIG. 20 is a diagram showing the reception quality information different from that in FIG. 1. Further, FIG. 21 A is a diagram showing a result in the low-frequency region of performing DCT processing on the reception quality information as shown in FIG. 20, where is a result of performing DCT processing with the CQI average value subtracted, and FIG. 21 B is a diagram showing a result in the low-frequency region of performing DCT processing on the reception quality information as shown in FIG. 20, where is a result of performing DCT processing without subtracting the CQI average value. FIG. 21 A and FIG. 21 B show result (signal component) of sample numbers 1 to 20. As shown in FIG. 21 A, when the DCT processing is performed after subtracting the CQI average value of all the subcarriers, a value of a sample (with Sample Number=1) with the lowest frequency component is zero. This is because the sample with the lowest frequency after the DCT processing indicates a DC component i.e. the average CQI value of all the subcarriers. Meanwhile, as shown in FIG. 21 B, when the average CQI value is not subtracted from each CQI value, the sample value of sample number 1 (Sample Number=1) indicates a large value.

Accordingly, by subtracting the CQI average value (average SNR) of all the subcarriers from the measured CQI value (SNR) of each subcarrier, and then performing DCT processing on the calculated subtracted value, a value of the first sample is zero, and any problem arises when the first sample is deleted in feedback. In addition, as described previously, when the feedback information subjected to such subtraction is reproduced by IDCT processing, the average value of reproduced CQI information is always zero, and the CQI information observed on the receiving side cannot be reproduced properly. Therefore, in the case of performing the subtraction as shown in this Embodiment, the information indicative of the average value is notified to the transmitting side separately. When the information indicative of the average value is thus notified separately, it may be considered that the feedback information is not reduced, but the CQI average value (average SNR) of all the subcarriers is mainly dependent on propagation loss and shadowing, and therefore, is a value that does not vary greatly as long as the terminal moves largely.

Accordingly, the communication apparatus for notifying the feedback information does not need to always send back the CQI average value, and by using the method of (1) sending back only in starting communications, (2) sending back regularly, or (3) sending back only when the average value varies greatly, is capable of deleting the number of feedbacks of the CQI average value. Therefore, it is possible to compress the feedback amount as a whole.

Figure 22:
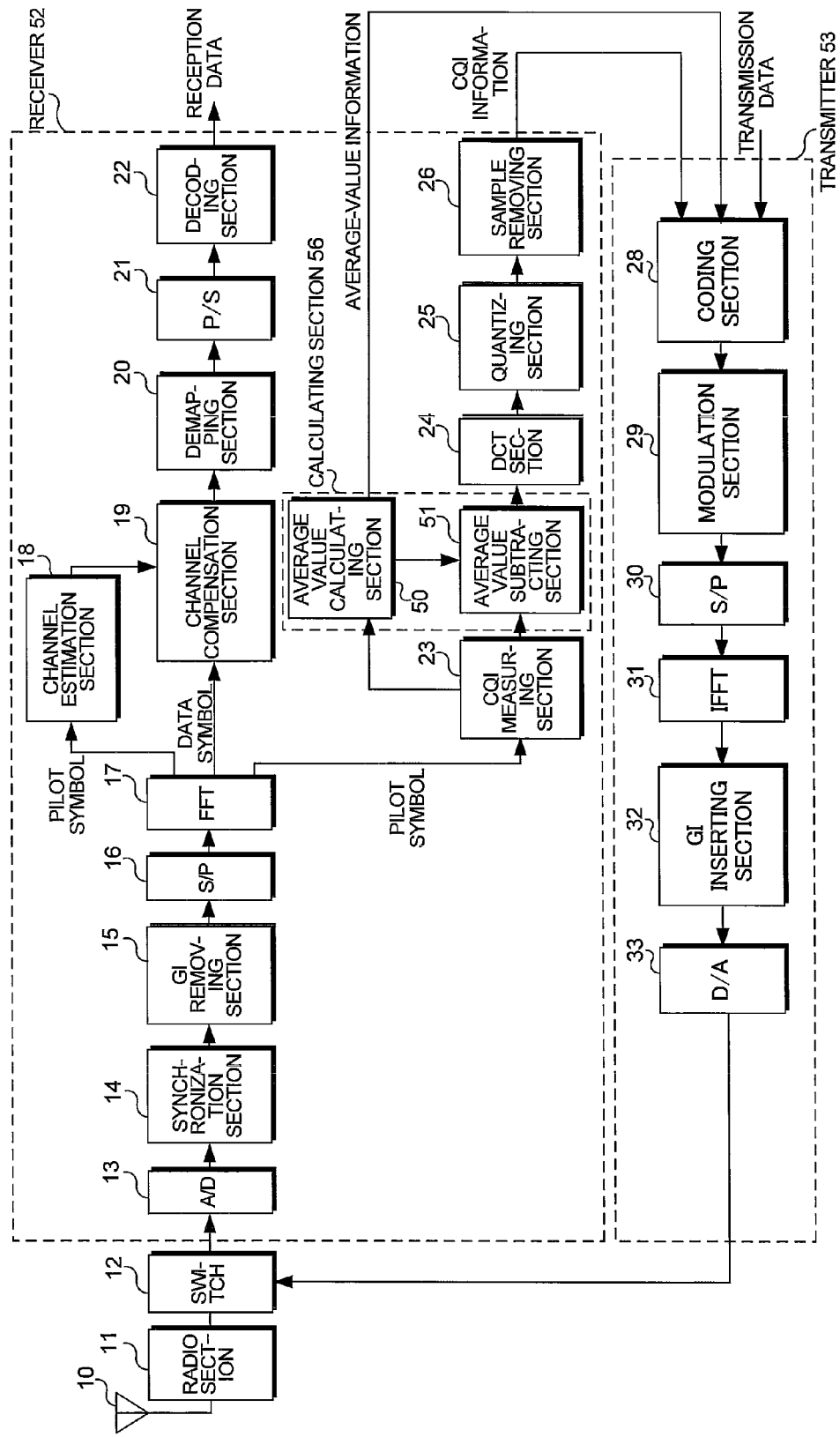
FIG. 22 is a block diagram showing an example of a transmitting/receiving configuration of a communication apparatus for notifying CQI information in Embodiment 4.
Figure 23:
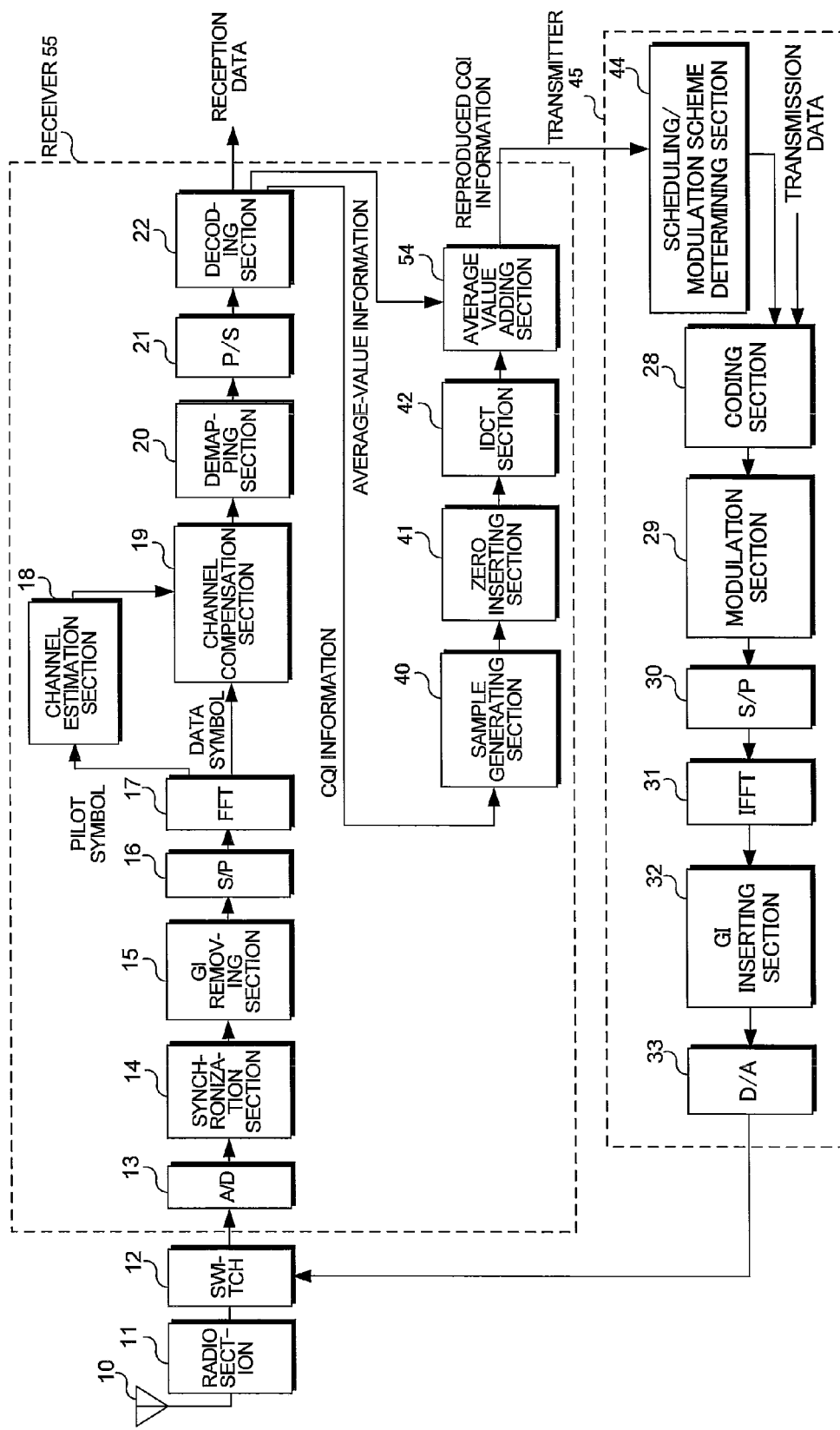
FIG. 23 is a block diagram showing an example of a transmitting/receiving configuration of a communication apparatus for receiving notification of the CQI information in Embodiment 4.

Configurations of the communication apparatuses in this Embodiment will be described below. FIG. 22 is a block diagram showing an example of a transmitting/receiving configuration of a communication apparatus for notifying the CQI information in Embodiment 4. FIG. 23 is a block diagram showing an example of a transmitting/receiving configuration of a communication apparatus for receiving notification of the CQI information in Embodiment 4. FIG. 22 shows the apparatus configuration of the side (terminal) for performing feedback of the CQI, while FIG. 23 shows the apparatus configuration of the side (base station) for receiving the feedback information. In this Embodiment, as the number of bits (information amount) for representing each sample (sample group), the numbers of bits as shown in FIG. 3 are used.

As shown in FIG. 22, the communication apparatus on the side of performing feedback of the CQI has a configuration such that the configuration of the receiver 27 as shown in FIG. 4 is given an average value calculating section 50 and average value subtracting section 51. The average calculating section 50 averages the reception quality information (CQIs) of subcarriers measured in the CQI measuring section 23 to calculate an average value. The average value subtracting section 51 performs the processing of subtracting the average value calculated in the average value calculating section 50 from the reception quality information (CQI) of each subcarrier measured in the CQI measuring section 23, and calculating a subtraction value. In addition, a calculating section 56 is regarded as having the combined functions of the average value calculating section 50 and average value subtracting section 51. Further, the average value (average-value information) of the CQI calculated in the average value calculating section 50 needs to be sent back to the communication apparatus of the communicating destination, and therefore, is input also to the coding section 28.

By providing such a constitution, it is possible to make the first sample zero as shown in FIG. 21 A and FIG. 21 B, and by the sample removing section 26 removing the first sample not to send back, it is possible to reduce the feedback amount.

Further, as shown in FIG. 23, the communication apparatus on the side of receiving the feedback information has a configuration such that the receiver 43 in FIG. 5 is given an average value adding section 54. In other words, such a configuration is provided that the received average-value information is demodulated in the receiver 55, and notified from the decoding section 22 to the average value adding section 54. The average value adding section 54 adds the average-value information (average value of the CQI) notified from the decoding section 22 to the CQI value of each subcarrier reproduced in the IDCT section 42, and thereby calculates actual reception quality information (CQI). By providing such a constitution, the CQI can be reproduced even when the CQI information with the average value subtracted is sent back.

Figure 24:
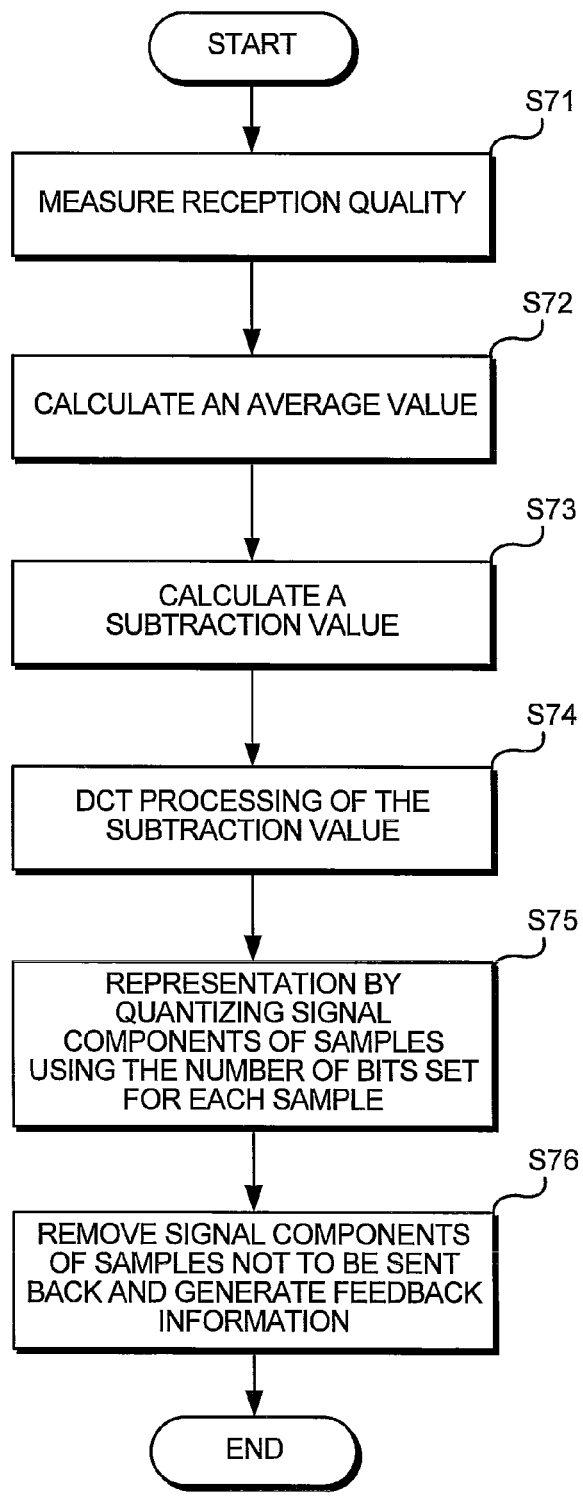
FIG. 24 is a flowchart showing an example of the operation for generating feedback information in Embodiment 4.
Figure 25:
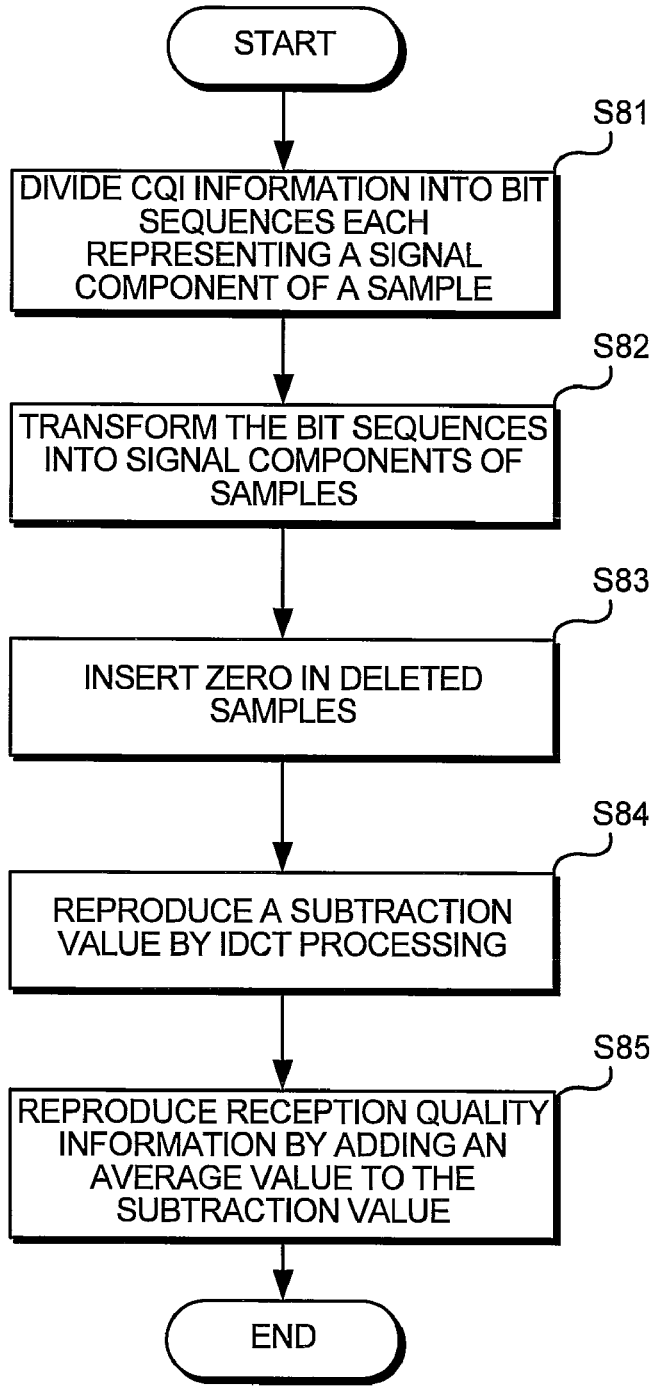
FIG. 25 is a flowchart showing an example of the operation for reproducing the reception quality information from the feedback information notified in Embodiment 4.
Figure 26:
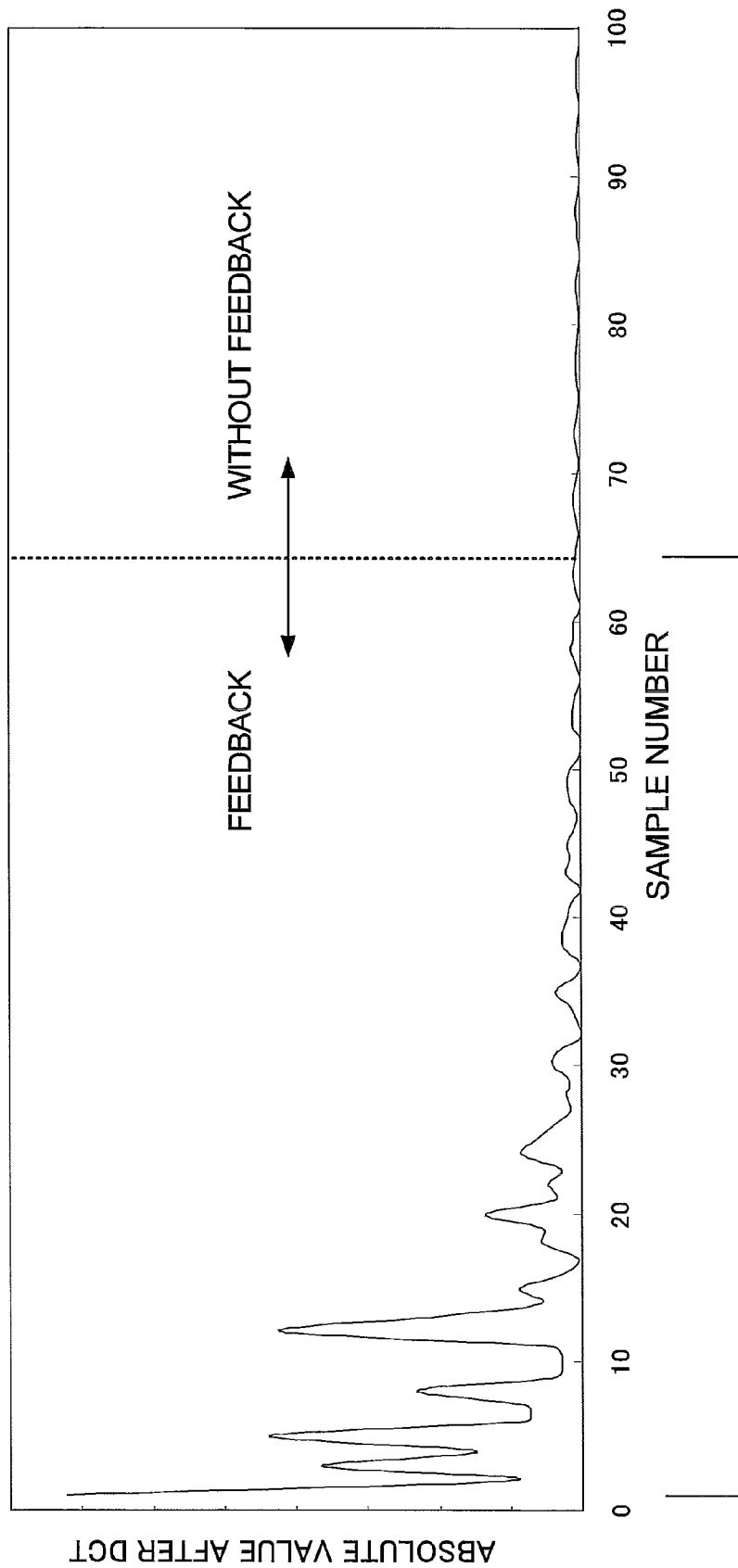
FIG. 26 is a diagram showing an example of a state where the low-frequency components are selected and sent back.

The generation of the feedback information and the reproduction of the reception quality information will be described below with reference to drawings. FIG. 24 is a flowchart showing an example of the operation for generating the feedback information in this Embodiment, and FIG. 25 is a flowchart showing an example of the operation for reproducing the reception quality information from the notified feedback information in this Embodiment.

The generation of the feedback information will be described first with reference to FIGS. 22 and 24. The CQI measuring section 23 measures the CQI (received SNR) of each subcarrier based on the received pilot symbol input from the FFT section 17 (step S71). Next, the average value calculating section 50 averages CQIs of subcarriers measured in the CQI measuring section 23 to calculate the average value (average-value information) (step S72), and outputs the calculated average value to the average value subtracting section 51 and coding section 28. The average value subtracting section 51 subtracts the average value from the CQI measured in the CQI measuring section 23 to calculate a subtraction value (step S73). The DCT section 24 performs DCT processing on the subtraction value calculated in the average value subtracting section 51 (step S74).

The quantizing section 25 quantizes the signal component of each sample using the number of bits beforehand set for each sample group (step S75). The quantizing section 25 holds the beforehand set number of samples (the number of feedbacks) for feedback, and the numbers of bits set for each sample. For example, for the number of bits for each example, in the case of FIG. 3, as "sample number-the number of bits" information of a combination of the sample number and the number of bits, the section 25 holds "16-12, 32-10, 48-8, 64-6". Then, the section 25 quantizes the first to 16th samples by 12 bits, and the 17th to 32nd samples by 10 bits. Further, the section 25 quantizes the 33rd to 48th samples by 8 bits, and the 49th to 64th samples by 6 bits. Furthermore, the 65th and subsequent samples do not undergo feedback in the example of FIG. 3, and therefore, may be quantized by the same or the lower number of bits as/than that of the 64th sample, or may undergo processing for outputting an input value without performing quantization in the quantizing section 25.

The sample removing section 26 deletes samples for which feedback is not performed (step S76). The sample removing section 26 beforehand holds the number of samples for feedback, and for example, in the example in FIG. 3, deletes the 65th and subsequent samples. In this way, signal components of 64 samples are generated as the CQI information (feedback information).

The reproduction of the reception quality information will be described below with reference to FIGS. 23 and 25. The sample generating section 40 transforms the CQI information input from the decoding section 22 from the information represented by bits (digital) into a signal component of each sample. More specifically, the sample generating section 40 properly divides a bit sequence of the CQI information decoded in the receiver 43 into bit sequences (one or more bit groups) representing each sample (each of 64 samples) (step S81), and transforms each of divided bit sequences to reproduce signal components of 64 samples (step S82). In addition, as in the quantizing section 25, the sample generating section 40 holds the number of samples for feedback and the number of bits for representing each sample. The zero inserting section 41 inserts zero in the sample positions of the 65th and subsequent samples deleted by the sample removing section 26 (step S83). The zero inserting section 41 performs insertion of zero corresponding to (the number of IDCT points minus the number of feedback samples).

The IDCT section 42 performs IDCT processing on the CQI information in which zero is inserted by the zero inserting section 41, and reproduces the subtraction value of each subcarrier from the received feedback information (step S84). The average value adding section 54 adds the average value (average information) input from the decoding section 22 to the reproduced subtraction value, and reproduces the reception quality information (CQI) of each subcarrier (step S85).

Thus, by using signal components of samples obtained by performing DCT processing on subtraction values obtained by subtracting an average value of the reception quality information from the reception quality information, it is possible to delete the signal component of the sample (low sample number) with the lowest frequency from the feedback information, and therefore, the feedback amount can be compressed as compared with each of the above-mentioned Embodiments.

In addition, this Embodiment describes the aspect of subtracting an average value of the reception quality information from the measured reception quality information (CQI), performing processing of making the signal component of the first sample subjected to DCT processing zero, and compressing the feedback information amount by not sending the first sample, but in contrast thereto, bits to be allocated to the first sample may be used for samples in the high-frequency region. For example, such a method is to allocate 12 bits, which is to be allocated to the first sample when the average value is not subtracted, to 65th to 67th samples by 4 bits, and by performing in this way, as in Embodiment 2, it is possible to reduce the reproduction error of CQI even in the channel conditions with large delay spread.

Further, when the technique for performing normalization with the maximum absolute value for each region as shown in Embodiment 3 is used together, some sample except the first sample has the maximum value in the lowest-frequency region, and normalization is performed using this sample. Generally, the first sample has an extremely larger component as compared to the other samples, and by performing normalization using a sample except the first sample, it is possible to set a fine resolution for representing each sample in the region as compared with the case of performing normalization using the first sample, and to reduce the reproduction error of CQI.

Furthermore, each of the above-mentioned Embodiments describes the case of using a result of performing DCT processing on the reception quality information as feedback information, but the processing is not limited to the DCT processing, and may be another method as long as the method is a transform method for collecting the reception quality information in predetermined frequencies. The present invention is applicable when the number of bits for representing a sample with a high signal component is made higher than the number of bits of a sample with a lower signal component, and a signal component (sample value) transformed by a predetermined method can be represented by the number of bits different between samples.

The invention claimed is:

1. A communication apparatus for communicating by using a plurality of subcarriers and transmitting feedback information generated based on channel conditions of the plurality of subcarriers to a communicating destination apparatus, comprising:
 a discrete cosine transform section which performs discrete cosine transform on the channel conditions of the plurality of subcarriers;
 a dividing section which divides a plurality of sample components obtained by the discrete cosine transform into a plurality of groups each including one or more sample components, the division based on frequency of the sample components; and
 a quantizing section which performs quantization corresponding to beforehand-set indices for each group, the indices defining a correspondence between one or more instances of a variable quantization parameter and the respective frequency divisions of the respective groups,
 wherein the feedback information is a result of the quantization, and
 the plurality of groups including at least a high-frequency group and a low-frequency group, the high-frequency group comprising sample components, from the plurality of sample components, that have a frequency that is higher than the frequency of sample components that constitute the low-frequency group.

2. The communication apparatus according to claim 1, wherein the quantizing section sets a respective different information amount or resolution on each of the groups, and quantizes each sample component of each group.

3. The communication apparatus according to claim 2, wherein the quantizing section sets a larger information amount or a finer resolution on the low-frequency group than on the high-frequency group.

4. The communication apparatus according to claim 3, wherein information corresponding to the highest-frequency group among the plurality of groups is not included in the feedback information.

5. The communication apparatus according to claim 2, wherein the quantizing section varies the information amount or resolution based on delay spread of the channel.

6. The communication apparatus according to claim 5, wherein the quantizing section sets a small information amount or a rough resolution for representing a signal component of the high-frequency sample group when the delay spread of the channel is less than a threshold, while setting a large information amount or a fine resolution for representing a signal component of the high-frequency sample group when the delay spread of the channel is the threshold or more.

7. The communication apparatus according to claim 2, wherein at least one group contains a number of samples different from a number of samples in at least one other group.

8. The communication apparatus according to claim 7, wherein each high-frequency group among the plurality of groups contains a larger number of samples than the low-frequency group.

9. The communication apparatus according to claim 8, wherein information corresponding to the highest frequency group among the plurality of groups is not included in the feedback information.

10. A method for communicating by using a plurality of subcarriers and transmitting feedback information generated based on channel conditions of the plurality of subcarriers to a communicating destination apparatus, the method comprising:

performing discrete cosine transform on the channel conditions of the plurality of subcarriers;

dividing a plurality of sample components obtained by the discrete cosine transform into a plurality of groups each including one or more sample components, the division based on frequency in the sample components; and performing quantization corresponding to beforehand-set indices for each group, the indices defining a correspondence between one or more instances of a variable quantization parameter and the respective frequency divisions of the respective groups, wherein the plurality of groups includes at least a high-frequency group and a low-frequency group, the high-frequency group comprising sample components, from the plurality of sample components, that have a frequency that is higher than the frequency of sample components that constitute the low-frequency group.

* * * * *